United States Patent
Family et al.

(10) Patent No.: US 10,856,081 B2
(45) Date of Patent: *Dec. 1, 2020

(54) SPATIALLY DUCKING AUDIO PRODUCED THROUGH A BEAMFORMING LOUDSPEAKER ARRAY

(71) Applicant: Apple Inc., Cupertino, CA (US)

(72) Inventors: Afrooz Family, Emerald Hills, CA (US); Gary I. Butcher, Los Gatos, CA (US); Hugo D. Verweij, San Francisco, CA (US); David C. Graham, San Jose, CA (US); Imran A. Chaudhri, San Francisco, CA (US); Marcos Alonso Ruiz, San Francisco, CA (US); Christopher J. Stringer, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,484

(22) Filed: Dec. 3, 2019

(65) Prior Publication Data

US 2020/0107122 A1    Apr. 2, 2020

Related U.S. Application Data

(63) Continuation of application No. 15/967,089, filed on Apr. 30, 2018, now Pat. No. 10,531,196.

(Continued)

(51) Int. Cl.
*H04R 3/12* (2006.01)
*H04R 1/40* (2006.01)
(Continued)

(52) U.S. Cl.
CPC ............... *H04R 3/12* (2013.01); *G10L 15/07* (2013.01); *H04R 1/403* (2013.01); *H04R 5/02* (2013.01);
(Continued)

(58) Field of Classification Search
CPC ........... G10L 15/07; G10L 17/06; H03G 3/00; H04R 1/28; H04R 1/30; H04R 1/40;
(Continued)

(56) References Cited

U.S. PATENT DOCUMENTS 4,823,908 A * 4/1989 Tanaka .................. G10K 11/28
                                                        181/148
8,190,438 B1    5/2012 Nelissen
(Continued)

FOREIGN PATENT DOCUMENTS

CN        103152483 A    6/2013
CN        106531165 A    3/2017
(Continued)

OTHER PUBLICATIONS

Communication pursuant to Article 94(3) EPC of the European Patent Office dated Apr. 1, 2020, for related European Patent Application No. 18175205.6.
(Continued)

*Primary Examiner* — Gerald Gauthier
(74) *Attorney, Agent, or Firm* — Womble Bond Dickinson (US) LLP

(57) ABSTRACT

A method for adjusting audio being outputted through a beam forming loudspeaker array. Program audio is rendered to drive the loudspeaker array to produce sound beams having i) a main content pattern that is aimed at a listener, superimposed with ii) several diffuse content patterns that are aimed away from the listener. In response to receiving an alert message that refers to alert audio, the portion of the program audio in the main pattern is moved into the diffuse patterns, and the alert audio is rendered to drive the loudspeaker array so that the portion of the program audio in the main pattern is replaced with the alert audio. Other embodiments are also described and claimed.

20 Claims, 9 Drawing Sheets

Related U.S. Application Data

(60) Provisional application No. 62/514,712, filed on Jun. 2, 2017.

(51) Int. Cl.

| | | |
|---|---|---|
| *G10L 15/07* | (2013.01) | |
| *H04R 5/02* | (2006.01) | |
| *H04R 5/04* | (2006.01) | |
| *H04S 7/00* | (2006.01) | |
| *H04R 27/00* | (2006.01) | |

(52) U.S. Cl.
CPC .............. *H04R 5/04* (2013.01); *H04R 27/00* (2013.01); *H04R 2201/401* (2013.01); *H04R 2203/12* (2013.01); *H04R 2227/003* (2013.01); *H04R 2227/005* (2013.01); *H04R 2420/01* (2013.01); *H04R 2420/07* (2013.01); *H04R 2430/01* (2013.01); *H04R 2499/13* (2013.01); *H04S 7/30* (2013.01); *H04S 7/305* (2013.01); *H04S 2400/13* (2013.01); *H04S 2420/01* (2013.01)

(58) Field of Classification Search
CPC . H04R 1/403; H04R 3/12; H04R 3/14; H04R 5/02; H04R 5/04; H04R 27/00; H04R 2201/401; H04R 2203/12; H04R 2227/003; H04R 2227/005; H04R 2420/01; H04R 2420/07; H04R 2430/01; H04R 2499/13; H04R 1/02; H04R 1/323; H04R 1/326; H04S 1/00; H04S 7/00; H04S 7/30; H04S 7/305; H04S 2400/13; H04S 2420/01; H04S 7/302; H04S 7/303; H04S 7/304; H04S 7/307; G06F 3/16; G06F 3/033; G10K 11/34; H04M 3/568; H04N 21/814
USPC .... 181/175; 381/17, 92, 303, 305, 335, 345; 340/540, 632, 692; 455/79; 725/81
See application file for complete search history.

(56) References Cited

U.S. PATENT DOCUMENTS

| | | | | |
|---|---|---|---|---|
| 9,118,767 | B1* | 8/2015 | Halferty | H04M 3/568 |
| 10,019,981 | B1* | 7/2018 | Porter | H04R 3/12 |
| 2001/0012371 | A1* | 8/2001 | Baumhauer, Jr. | H04R 11/06 |
| | | | | 381/345 |
| 2005/0136848 | A1* | 6/2005 | Murray | H04M 1/605 |
| | | | | 455/79 |
| 2005/0140519 | A1* | 6/2005 | Smith | G10H 1/0083 |
| | | | | 340/692 |
| 2007/0283395 | A1* | 12/2007 | Wezowski | H04M 19/041 |
| | | | | 725/81 |
| 2008/0232607 | A1 | 9/2008 | Tashev et al. | |
| 2010/0201530 | A1* | 8/2010 | Wende | G01N 33/004 |
| | | | | 340/632 |
| 2010/0310080 | A1* | 12/2010 | Fukuyama | H04R 3/12 |
| | | | | 381/17 |
| 2011/0096941 | A1* | 4/2011 | Marzetta | H04R 1/403 |
| | | | | 381/92 |
| 2012/0146790 | A1* | 6/2012 | Ladouceur | G08B 3/10 |
| | | | | 340/540 |
| 2013/0094653 | A1* | 4/2013 | Bathurst | H04L 12/1827 |
| | | | | 381/17 |
| 2013/0259238 | A1* | 10/2013 | Xiang | H04R 3/005 |
| | | | | 381/17 |
| 2016/0021481 | A1* | 1/2016 | Johnson | H04S 7/303 |
| | | | | 381/303 |
| 2016/0088388 | A1* | 3/2016 | Franck | H04R 27/00 |
| | | | | 381/305 |
| 2016/0295340 | A1* | 10/2016 | Baker | H04R 1/403 |
| 2016/0353205 | A1* | 12/2016 | Munch | H04R 3/14 |
| 2017/0070838 | A1* | 3/2017 | Helwani | H04S 5/005 |
| 2017/0105084 | A1* | 4/2017 | Holman | H04R 5/04 |
| 2017/0171640 | A1* | 6/2017 | Shintani | H04N 21/2353 |
| 2017/0223447 | A1* | 8/2017 | Johnson | H04R 1/2807 |
| 2017/0230772 | A1* | 8/2017 | Johnson | H04S 1/002 |
| 2017/0230776 | A1* | 8/2017 | Family | H04R 5/02 |
| 2017/0238090 | A1* | 8/2017 | Johnson | H04R 1/24 |
| | | | | 381/335 |
| 2017/0257723 | A1* | 9/2017 | Morishita | H04R 5/033 |
| 2017/0280231 | A1* | 9/2017 | Johnson | H04R 1/025 |
| 2017/0280265 | A1* | 9/2017 | Po | H04S 7/30 |
| 2017/0347191 | A1* | 11/2017 | Button | H04R 3/12 |
| 2017/0374465 | A1* | 12/2017 | Family | H04R 3/12 |
| 2018/0098172 | A1* | 4/2018 | Family | H04R 5/04 |
| 2018/0242097 | A1* | 8/2018 | Kriegel | H04S 3/008 |
| 2018/0317035 | A1* | 11/2018 | Hayashi | H04R 5/04 |
| 2018/0317036 | A1* | 11/2018 | Hayashi | H04R 3/12 |
| 2018/0341455 | A1* | 11/2018 | Ivanov | G06F 40/58 |
| 2018/0352324 | A1* | 12/2018 | Choisel | H04R 1/403 |
| 2018/0352334 | A1* | 12/2018 | Family | H04R 3/12 |
| 2020/0107122 | A1* | 4/2020 | Family | H04R 1/403 |

FOREIGN PATENT DOCUMENTS

| | | |
|---|---|---|
| CN | 106572418 A | 4/2017 |
| EP | 1 850 640 A1 | 10/2007 |
| WO | WO 2007/113718 A1 | 10/2007 |
| WO | WO 2013/142641 A1 | 9/2013 |

OTHER PUBLICATIONS

First Office Action of the China National Intellectual Property Administration dated Apr. 2, 2020 for related Chinese Patent Application No. 201810553141.4.

Notice of Preliminary Rejection of the Korean Intellectual Property Office dated Apr. 24, 2020 for related Korean Patent Application No. 10-2020-0012494, a Division of Korean Patent Application No. 10-2018-0058155.

1st examination report issued by IP Australia on Oct. 7, 2020 for related Australian Patent Application No. 2020201425.

\* cited by examiner

SPATIALLY DUCKING AUDIO PRODUCED THROUGH A BEAMFORMING LOUDSPEAKER ARRAY

CROSS REFERENCE TO RELATED APPLICATIONS

This application is a continuation of U.S. application Ser. No. 15/967,089, filed Apr. 30, 2018, which claims the benefit of the earlier filing date of U.S. provisional application 62/514,712 filed Jun. 2, 2017.

FIELD

An embodiment of the invention relates to spatially ducking program audio that is being rendered for output through a loudspeaker array. Other embodiments are also described.

BACKGROUND

Loudspeaker arrays may generate beam patterns to project sound in different directions. For example, a beam former may receive input audio channels of sound program content (e.g., music) and convert the input audio channels to several driver signals that drive the transducers of a loudspeaker array to produce one or more sound beam patterns. Having several beam patterns allows the audio system to project the sound in different directions throughout a room in which the loudspeaker array is located.

SUMMARY

Computer programs or applications call for different types of audio to be rendered and outputted (or played back) for a listener. For instance, a reminder application may produce an audible notification (e.g., "Tee time in 30 minutes") that is rendered and outputted by an audio system. Another example is a computer program that works as a virtual personal assistant ("VPA"), which allows a listener to initiate and conduct a conversation with the virtual assistant. For example, the listener may trigger the VPA by speaking a trigger phrase ("Hey Hal, do you read me?") and then ask the VPA a question (or issue a command.) In response, the VPA will retrieve an audible response as an audio signal that is rendered and outputted by the system ("How can I help you Dave?" or "Just what do you think you're doing, Dave? Dave, I really think I'm entitled to an answer to that question.") Outputting these types of audio to the listener while ongoing sound program content (program audio), such as a musical composition is being outputted is disruptive to the listener.

A better solution is to "duck" the ongoing sound program content. For example, while enjoying music being outputted by the system, the listener may want to interact with the VPA. This interaction may start with the listener saying a trigger phrase or pressing a button. Once the system determines that the listener wants to interact with the VPA, the music being outputted may be ducked (e.g., its volume reduced), while the VPA and listener interact through spoken words. Once the interaction is determined by the device to be complete, the device may resume output of the music without ducking being applied. This may be a better solution than repeated pausing and resuming, or simply lowering and increasing the volume, as the latter may not only be disruptive to the listener, but also to other listeners who are not directly interacting with the VPA.

An embodiment of the invention is an audio system that "spatially ducks" program audio of a piece of sound program content (e.g., music) whose output is ongoing, while simultaneously outputting alert audio, thereby gracefully and briefly lessening the distraction caused by the music during for example a VPA session. The spatial ducking effectively changes a listener's perception of the music by pulling it from a "foreground," and moving it into a "background." Outputting the music in the background gives the listener the perception that the music is being outputted at a far away place (e.g., in another room). Said another way, the spatial ducking results in "blurring" the sound of the music as experienced by the listener, making the origin of the sound (e.g., from a loudspeaker cabinet of the audio system) not easily identifiable by the listener. Once the ongoing sound program content starts to be spatially ducked, the alert audio may be outputted in the foreground. This allows the listener to more directly hear the alert audio, even while the music continues to output in the background in a pleasant manner (rather than being paused or simply outputted with reduced volume), which is less disruptive to the listener's experience.

One embodiment of the invention is a method, performed by a loudspeaker array-based beam forming audio system, that spatially ducks program audio of a piece of sound program content that is being outputted by the loudspeaker array. This results in continued output of the program audio but in a background, while an alert audio is outputted in a foreground. The system has a rendering processor that receives the program audio and renders it into transducer driver signals that are converted into sound by the loudspeaker array. Now, consider the case where during normal output (while there is no alert audio to be outputted), the received program audio is being rendered using a main-diffuse beam forming rendering mode. In that mode, the loudspeaker array is driven to produce several sound beams, having i) a main content pattern (main beam), superimposed with several diffuse content patterns (two or more diffuse content lobes or beams) that are aimed in different directions. During the program audio's output in this rendering mode, a listener may attempt to initiate a conversation with a VPA by saying a "trigger phrase." The spoken trigger phrase is sensed, through a microphone of the audio system. An automatic speech recognizer analyzes the sensed speech of the listener to find (or recognize) speech therein. The recognized speech is sent to a trigger phrase detector, in order to determine whether there is a trigger phrase within the recognized speech.

Once the trigger phrase is detected, an alert audio needs to be rendered and outputted to the listener (as the "vocal" response of the VPA.) In one embodiment, a suitable textual response to the trigger phrase is first retrieved (formulated or accessed from storage), e.g., "How can I help you, Dave?" This is then provided to a text to speech, TTS, system, which is also signaled to produce a synthesized speech version of the suitable textual response (as the alert audio.) Alternatively, the alert audio may be retrieved as a previously recorded, human-spoken phrase (that is deemed suitable to be a response to the trigger phrase.) In both instances, an alert message that points to or contains the alert audio, which includes a suitable speech response by the VPA intended to be outputted in response to an alert audio triggering event, is provided to the decision logic (and optionally to the rendering processor.)

In response to the alert message, decision logic acting together with the rendering processor i) move a portion (some or all) of the program audio that is being output in the main content pattern (main beam), into the diffuse content patterns (two or more beams), and in a sense, "replace" the portion of the program audio that was moved from the main content pattern with the alert audio. This gives the listener a clear, direct audible feedback (from the VPA), effectively presenting the VPA's response in the foreground while spatially ducking the ongoing sound program content (moving it into the background.)

While rendering the program audio in the main-diffuse rendering mode, the decision logic (or decision processor) performs content analysis upon several input audio channels (e.g., Left and Right channels) of the program audio, to find correlated content and uncorrelated (decorrelated) content therein. Then, using the beam forming capabilities of the rendering processor, the correlated content is rendered in the main content pattern beam (and not in the diffuse content pattern beams or lobes), while the decorrelated content is rendered in one or more of the diffuse content pattern beams (or lobes). In that situation, in response to an alert message being received, the following process may be performed (in order to spatially duck the program audio): the "current" portion of the program audio that is being outputted within the main content beam pattern is identified, and a decorrelation process is performed upon it prior to it being provided to a content analysis routine of the decision logic. This decorrelation may be achieved by adding reverberation into those segments of one or more of the input audio channels of the program audio that contain the identified, current portion. As a result, the content analysis routine will then detect the now decorrelated content, and will signal the rendering processor to render that content in the diffuse content pattern beams. Thus, this approach directly or inherently results in the diffuse content pattern beams containing both i) the originally direct portion of the program audio that has been intentionally decorrelated by the audio system (e.g., by virtue of the added reverberation), along with the originally diffuse portion of the program audio.

The above was an example of how a portion of the program audio that includes original correlated or direct content, and is being outputted through the main content pattern beam when an alert message is received, is moved into the diffuse content pattern beams. As the main content pattern beam becomes partly or entirely devoid of the original direct or correlated content of the program audio, the alert audio, which may be deemed as including solely correlated content (e.g., mono audio, or a single audio channel) is added or effectively inserted into the main content pattern beam (and not into any of the diffuse content pattern beams.)

In another embodiment, the sensation of moving the direct content portion of the program audio into the background is achieved by the combination of 1) adding reverberation (to at least the direct content portion), 2) moving it into the diffuse content pattern beams, and 3) filtering it through a low-pass filter to remove high-frequency content. In another embodiment, instead of, or in addition to, the low pass filtering, the scalar full band gain of the direct content portion may be adjusted so as to reduce its "volume level". In all of these instances, the listener will hear a crisp and intelligible alert audio, while the spatially ducked program audio continues to output but "in the background" thereby providing a more pleasant listening experience.

When the program audio is being rendered in other sound rendering modes (different than the main-diffuse mode described above), the way in which the program audio is spatially ducked (effectively moved into the background) in response to an alert message being received, may be different. For instance, consider a mid-side rendering mode in which the rendering processor drives the loudspeaker array to produce several simultaneous sound beams having i) an omni-directional pattern, superimposed with a directional pattern that has several lobes. When the alert message is received during such output, the rendering processor i) moves a portion (some or all) of the program audio that is presently in the omni-directional pattern into the several lobes of the directional pattern, and in a sense, replaces the moved portion (in the omni-directional pattern) with the alert audio.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1A:
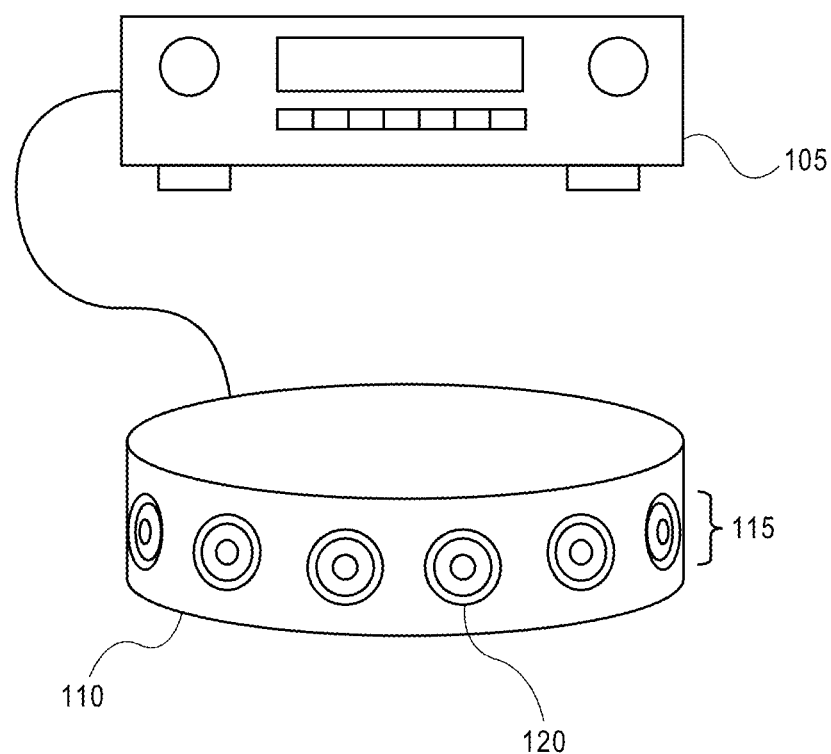
FIG. 1A is shows an audio receiver and a cylindrical loudspeaker cabinet that includes a loudspeaker array.

FIG. 1A shows an audio receiver 105 and a generally cylindrical shaped loudspeaker cabinet 110 that includes a loudspeaker array 115. The audio receiver 105 may be coupled to the cylindrical loudspeaker cabinet 110 to driver individual drivers 120 of the loudspeaker array 115 to emit various sound beams into a listening area. Although shown as being coupled by a cable, such as wires, the receiver 105 may alternatively communicate with the loudspeaker cabinet 110 through wireless means. In other embodiments, functions performed by the audio receiver 105 (e.g., digital signal processing by an audio rendering processor) may be performed by electronic circuit components that are housed within the loudspeaker cabinet 110, thereby combining a portion or all of the electrical hardware components of the receiver 105 and the loudspeaker cabinet 110 into a single enclosure. In one embodiment, the audio receiver 105 and the loudspeaker cabinet 110 may be part of a home audio system while in another embodiment they may be part of an audio or infotainment system integrated within a vehicle.

The drivers 120 in the loudspeaker array 115 may be arranged in various ways. As shown in FIG. 1A, the drivers 120 are arranged side by side and circumferentially around a center vertical axis of the cabinet 110. Other arrangements for the drivers 120 are possible. The drivers 120 may be electrodynamic drivers, and may include some that are specially designed for sound output at different frequency bands including any suitable combination of tweeters and midrange drivers, for example. In addition, the cabinet 110 may have other shapes, such as a donut shape, or a generally spherical or ellipsoid shape in which the drivers 120 may be distributed evenly around essentially the entire surface of the ellipsoid. In another embodiment, the cabinet 110 may be part of smartphone, a tablet computer, a laptop, or a desktop computer.

Figure 1B:
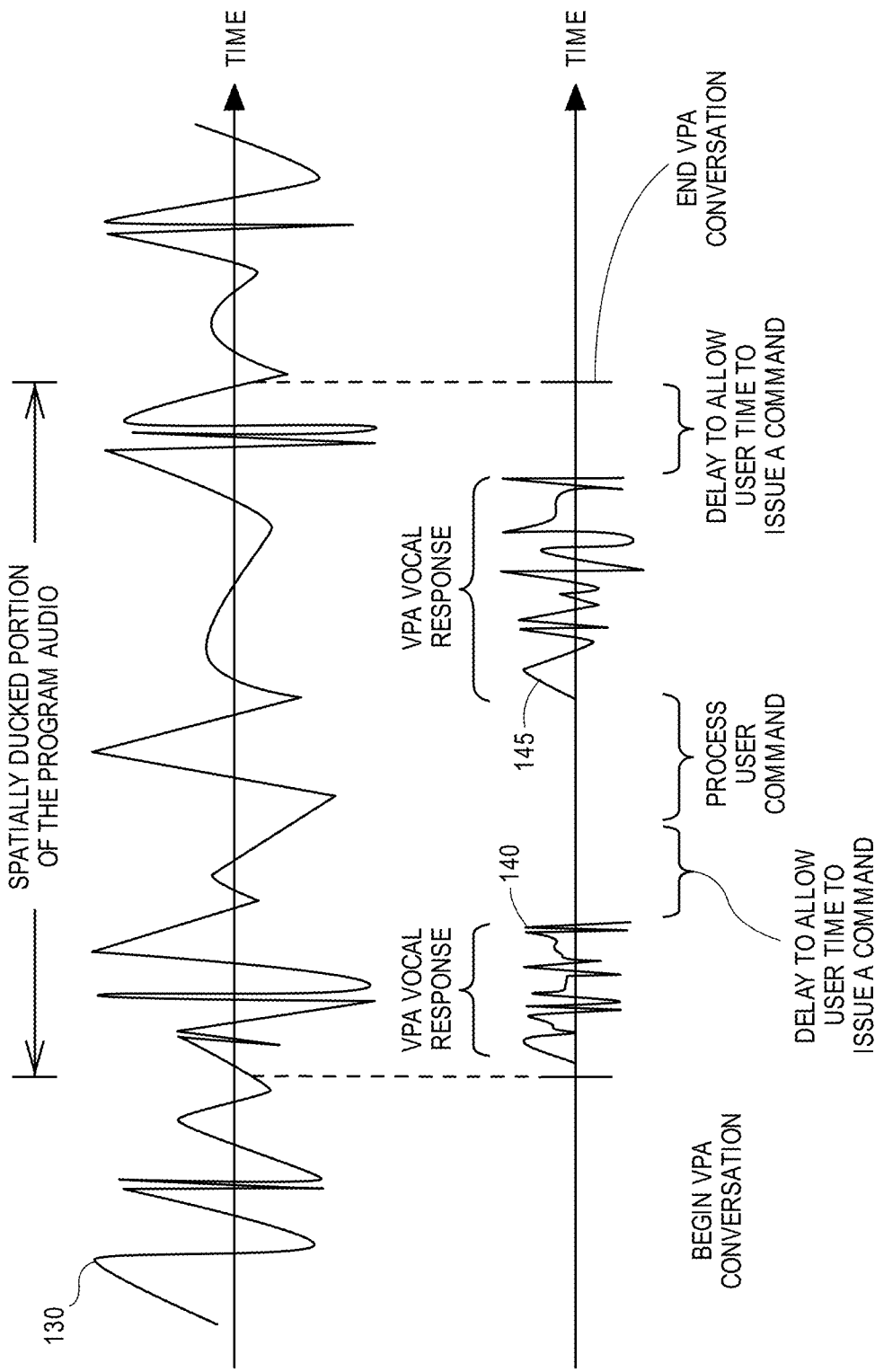
FIG. 1B shows timelines of simultaneous output of the program audio that is spatially ducked and the VPA vocal responses, during a VPA session.

FIG. 1B shows timelines of program audio of a piece of sound program content and VPA vocal responses (e.g., alert audios) that is being outputted simultaneously, during a VPA session. Specifically, this figure shows a top timeline of program audio 130 (e.g., input audio channels), as it is being provided to decision logic 215—see FIG. 2A. The decision logic may process the program audio 130, in order for the rendering processor to render and output the program audio 130 in one of several rendering modes. This figure also has a bottom timeline of several VPA vocal responses (e.g., alert audios) 140 and 145. These responses are also provided to the decision logic (and subsequently rendered for output by the rendering processor), while the program audio 130 is spatially ducked, thereby allowing the listener to communicate with the VPA during a VPA session without being unduly distracted by the program audio. This figure will be described further below as an example of a process for spatially ducking audio using a beam forming loudspeaker array.

Figure 2A:
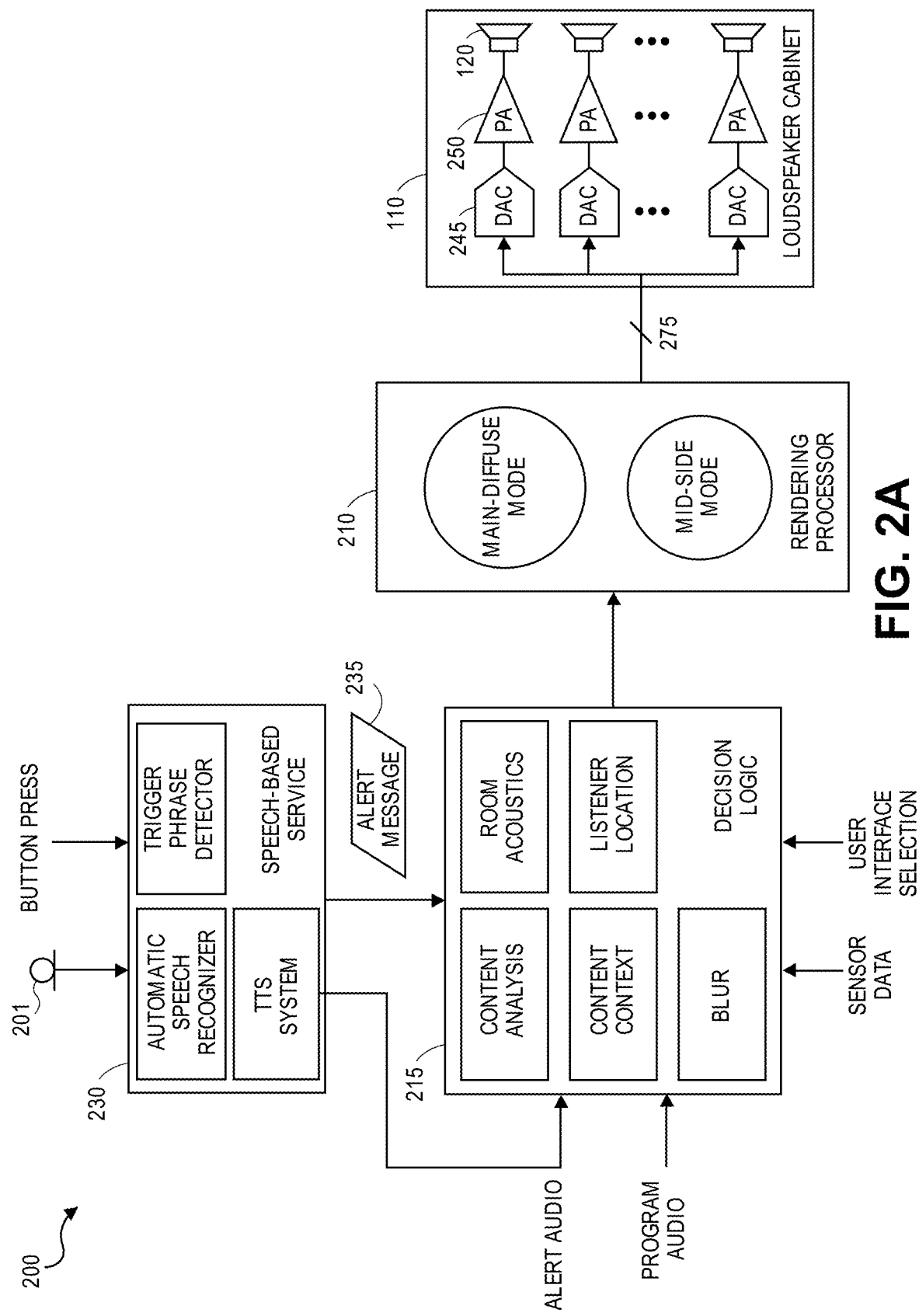
FIG. 2A is a block diagram of an audio system having a beam forming loudspeaker array.

FIG. 2A shows a block diagram of an audio system 200 having a beam forming loudspeaker array that is being used to output program audio of a piece of sound program content (e.g., a musical work, or a movie soundtrack). The audio system 200 includes the loudspeaker cabinet 110, a rendering processor 210, decision logic 215 (also referred to as a decision processor), and a speech-based service 230. The loudspeaker cabinet 110 in this example includes therein a number of power audio amplifiers 250 each of which has an output coupled to the drive signal input of a respective loudspeaker driver 120. The loudspeaker cabinet 110 "outputs" or "plays back" the program audio by using the loudspeaker drivers 120 to convert the resulting digital speaker driver signals into sound. This can be achieved using amplifiers 250 each of which can receive an analog input from a respective digital to analog converter (DAC) 245, where the latter receives its input digital audio signal through an audio communication link 275. Although the DAC 245 and the amplifier 250 are shown as separate blocks, in one embodiment the electronic circuit components for these may be combined, not just for each driver but also for multiple drivers, in order to provide for a more efficient digital to analog conversion and amplification operation of the individual driver signals, e.g., using for example class D amplifier technologies.

The individual digital audio driver signal for each of the drivers 120 is delivered through the audio communication link 275, from the rendering processor 210. The rendering processor 210 may be implemented within a separate enclosure (for example, as part of the receiver 105 of FIG. 1A) than the loudspeaker cabinet. The rendering processor 210 as well as other digital signal processing components shown in FIG. 2A may be implemented within other devices, e.g., a smartphone, a tablet computer, a laptop computer, or a desktop computer. In these instances, the audio communication link 275 is more likely to be a wireless digital communication link, such as a BLUETOOTH link or a wireless local area network link. In other instances, however, the audio communication link 275 may be over a physical cable, such as a digital optical audio cable (e.g., a TO SLINK connection), or a high-definition multi-media interface (HDMI) cable. In still other embodiments, the rendering processor 210 may be implemented within the loudspeaker cabinet 110, where in that case the audio communication link 275 could be a wired connection such as any suitably fast combination of on-chip and chip-to-chip digital or electro-optical interconnects.

The rendering processor 210 is to receive program audio of a piece of sound program content (e.g., from the decision logic 215). This program audio may include a number of input audio channels, such as left ("L") and right ("R") channels of a stereophonic recording. Such program audio may be that of a musical work, which may have been originally recorded as only two channels. Alternatively, the program audio may be in the form of more than two input audio channels, such as for example the entire audio soundtrack in 5.1-surround format of a motion picture film or movie intended for a home theater audio system or a large public movie theater setting. In another embodiment, the program audio may be in the form of a single, input audio channel. In all of these instances, the program audio is converted into sound by the drivers 120, after having been rendered by the rendering processor 210 which transforms the input channels into individual input drive signals to the transducers or drivers of the loudspeaker array. The rendering processor 210 may be implemented as a programmed, digital microprocessor entirely, or as a combination of a programmed processor and dedicated hardwired digital circuits such as digital filter blocks and state machines.

The rendering processor 210 may contain a beam former that can be configured to produce the individual drive signals for the drivers 120 so as to "render" the audio content of the input audio channels as multiple, simultaneous, desired beams emitted by the drivers 120 (part of the beam forming loudspeaker array.) The beams may be shaped and steered by the beam former, and audio content in each beam may be tailored from the input audio channels, in accordance with any one of a number of pre-configured, sound rendering modes of operation (as later explained).

The rendering processor 210 may have several beam forming, sound rendering modes of operation, for example two or more mid-side modes and at least one main-diffuse (e.g., ambient-direct) mode. These modes are viewed as distinct stereo enhancements to the input audio channels from which the system can choose, based on which ever is expected to have the best or highest impact on the listener in the particular room (and for the particular content that is being outputted). The rendering processor 210 is pre-configured with such operating modes, and its current operating mode can be selected and changed by the decision logic 215 in real time, during output of the piece of sound program content. More about the sound rendering modes of operation are described below.

The decision logic 215 (decision processor) may be implemented as a programmed processor, e.g., by sharing the central processing unit, applications processor or system on a chip that includes the rendering processor 210, or by the programming of a different microprocessor. The decision logic 215 may make several different decisions and/or perform several different audio processing operations. For instance, the decision logic 215 may be executing a program that based on certain inputs, makes a decision as to which sound rendering mode to use, for a given piece of sound program content that is being or is about to be outputted. The selected rendering mode then configures the rendering processor 210 to drive the loudspeaker drivers 120 (during output of the piece of sound program content) to produce the combination of beams and the audio content therein. The sound rendering mode can change automatically during the output (without requiring direct or immediate input from a user or listener of the audio system 200), based on changes in one or more of listener location, room acoustics, and content analysis, as performed by the decision logic 215.

The decision logic 215 may automatically (that is without requiring immediate input from a user or listener of the audio system 200) select and/or change the rendering mode selection during the output, based on changes in its decision logic inputs. In one embodiment, the decision logic inputs include one or both of sensor data and a user interface selection. The sensor data may include measurements taken by, for example a proximity sensor, a camera, or one or more microphones. The user interface selection may be data manually entered by the listener that delineates the bounds of the room and the location of certain objects therein, e.g., furniture. Using this information, the decision logic 215 may compute a listener location and/or acoustically significant features of the room (e.g., location of ceiling, walls, floor, and certain objects) relative to the loudspeaker cabinet 110. The sensor data may also be used to measure a sound reflection value, a sound absorption value, or an impulse response for the room. The decision logic 215 may have the ability to evaluate acoustic interactions between individual loudspeaker drivers 120 and the room, for example to determine when the loudspeaker cabinet 110 has been placed close to an acoustically reflective surface. In such a case, the decision logic 215 may select the main-diffuse mode, which includes a diffuse content pattern beam that may be oriented or steered at a certain angle in order to promote a desired stereo enhancement or immersion effect. For instance, the diffuse content pattern(s) may be orientated away from a listener and allowed to bounce off an adjacent wall of the room in order to create a more diffusive sound environment.

Figure 3:
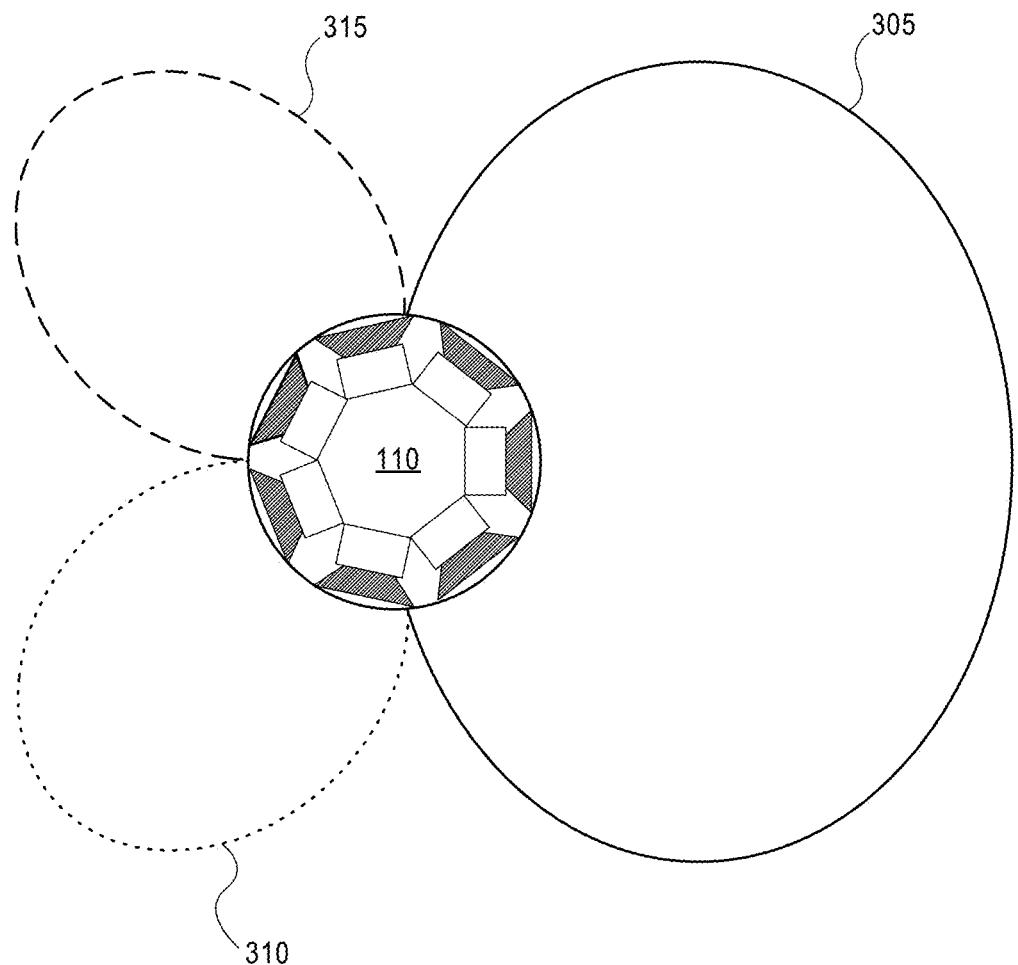
FIG. 3 shows a downward view of example sound beams produced by the audio system according to one embodiment of the invention.

In the main-diffuse mode, the outputs of a beam former in the rendering processor 210 may cause the loudspeaker drivers 120 to produce sound beams having i) a main content pattern, superimposed with several diffuse content patterns. As an example, FIG. 3 depicts sound beams produced in such a mode. Specifically, this figure shows a downward view of the loudspeaker cabinet 110, while it is producing the main content pattern 305 (also referred to here as a beam) and diffuse content patterns 315 and 310 (e.g., two or more beams, or two or more lobes.) Although the figures are depicting only two diffuse content patterns, in one embodiment there may be more than two diffuse content patterns (more than two beams, or more than two lobes, that contain the diffuse content.)

In one embodiment, the main content pattern 305 and the diffuse content patterns 310, 315 are all aimed in different directions, such as shown. The main content pattern 305 may be intentionally aimed at a determined listener position (e.g., user-specified, or automatically detected), while the diffuse content patterns 310 and 315 are in that case aimed away from the determined listener position.

In another embodiment, the diffuse content patterns are intentionally aimed towards a determined position of an adjacent wall, window or other surface, such as that of a furniture item (which position may have been specified by a user or it may have been automatically detected), while the main content patter is aimed away from the determined position (at a different direction.) The determined position of the adjacent acoustic surface or the determined listener position may be computed by the decision logic 215, as previously described, using any suitable combination of its inputs including sensor data and user interface selections. Thus, certain parameters of the main-diffuse mode may be variable (e.g., beam width and angle) dependent on audio content, room acoustics, and loudspeaker placement.

The main content pattern 305 and the diffuse content patterns (e.g., 310 and 315) may each contain portions of the program audio. For instance, the decision logic 215 may analyze the input audio channels of the program audio (e.g., L and R), for example using time-windowed correlation, to find correlated content and uncorrelated (or decorrelated) content therein. The decision logic 215 may inform the rendering processor 210 which content (e.g., correlated or decorrelated) should be rendered within at least one of the content patterns. For example, the correlated content contained within the input audio channels may be rendered in the main content pattern 305, since correlated content that effectively appears within each of the input audio channels is a genuine, "dry" center image. In contrast, the decorrelated content that is contained within the input audio channels may be extracted (e.g., by performing the difference computation of L-R or R-L), and is then placed within the diffuse content patterns 310 and 315.

Figure 5:
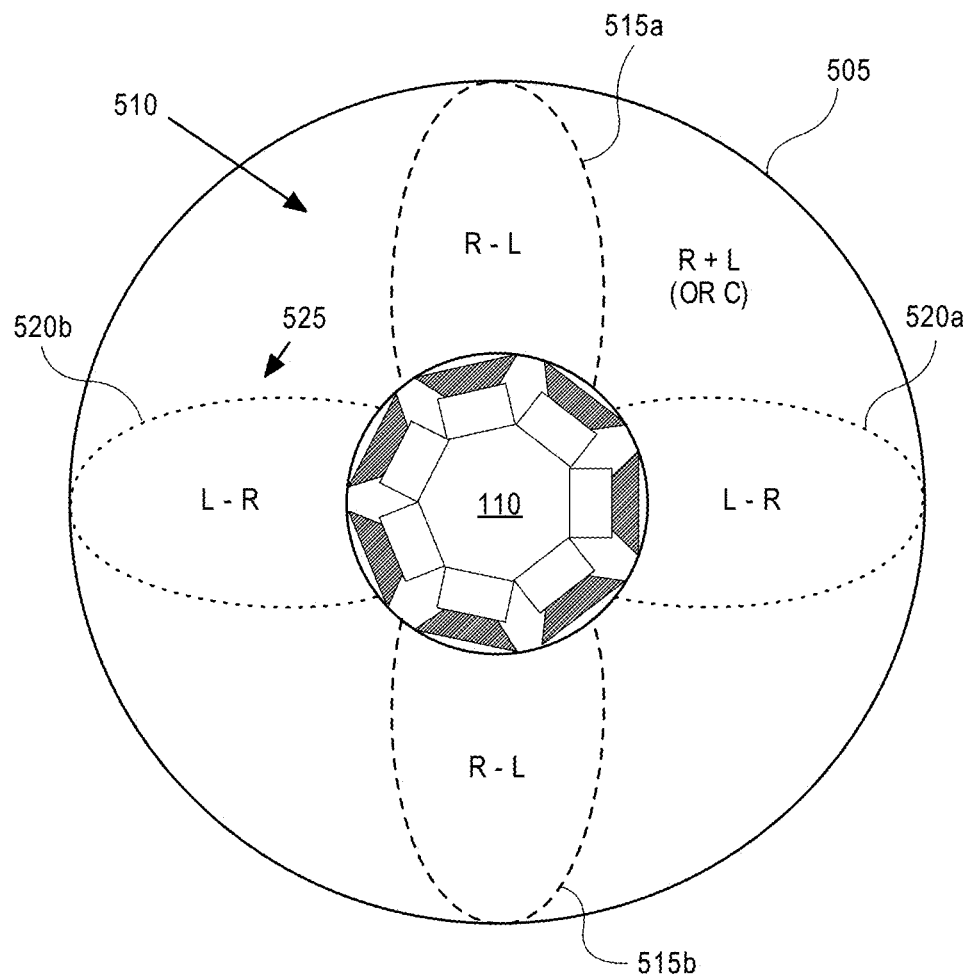
FIG. 5 shows a downward view of example of sound beams produced by the audio system according to another embodiment of the invention.

The rendering processor also has other sound rendering modes, including one or more mid-side modes. In each of the mid-side modes, the outputs of the rendering processor 210 may cause the loudspeaker drivers 120 to produce sound beams having i) an omni-directional pattern, superimposed with a directional pattern that has several lobes. As an example, FIG. 5 depicts sound beams produced in one such mode. Specifically, this figure shows a downward view of the loudspeaker cabinet 110, while it is producing the omni-directional pattern 505 and a directional pattern 525, here a quadrupole beam with four primary lobes 515a, 515b, 520a, and 520b. Although this figure illustrates a higher-order mid-side mode (a quadrupole beam), the rendering processor 210 may also be configured with other mid-side modes of different orders (e.g., a lower-order mid-side mode that produces a dipole beam).

A selection by the decision logic 215 as between a lower-order mode and a higher-order mode may be a function of at least one of the following factors or parameters, e.g., current listener position, room acoustics, and content analysis of the input audio channels. For instance, the selection may be based on content analysis, where the choice of a lower-order or a higher-order directional pattern may be based on spectral and/or spatial characteristics of the input audio channels, such as the amount of ambient or diffuse sound content (e.g., reverberation). It should be noted that certain types of diffuse content could benefit from being outputted through a lower-order mid-side mode, which accentuates the spatial separation of uncorrelated (decorrelated) content in a room. Other types of content that already contain a strong spatial separation, such as hard-panned discrete sources, may benefit from a higher-order mid-side mode, that produces a more uniform stereo experience around the loudspeaker. In the extreme case, a lowest order mid-side mode may be one in which there is essentially only the omni-directional pattern 505 being produced, without any directional beam such as the directional pattern 525, which may be appropriate when the sound content is purely monophonic.

Similar to the main content pattern 305 and diffuse content patterns 310 and 315, illustrated in FIG. 3, the omni-directional pattern 505 and the directional pattern 525 contain appropriately selected or combined portions of the program audio by the decision logic 215. For instance, the decision logic 215 may inform the rendering processor to compose these beam patterns of either a combination and/or a difference of two or more input audio channels of the program audio. In other words, the decision logic 215 may process (e.g., combine and/or subtract) the two or more input audio channels and send the results to the rendering processor 210, in order for the rendering processor 210 to render the results in specific beam patterns. For example, referring back to FIG. 5, in the case in which the program audio contains two input audio channels (e.g., L and R), the omni-directional beam pattern 505 (which is a monophonic main content pattern) may contain correlated audio content that is a combination of these two channels (e.g., L+R). The lobes of the directional pattern 525, on the other hand, contain decorrelated audio content, which results from differences between the input audio channels. For instance, a front-pointing lobe 515*b* contains R–L content, a back-pointing lobe 515*a* contains R–L content, a right-pointing lobe 520*b* contains L–R content, and a left-pointing lobe 520*a* contains L–R content. The combination or superposition of the directional pattern 525 with the omni-directional pattern 505 thus creates sectors of audio (that together span 360 degrees around a center of the loudspeaker cabinet 110). In the example shown in FIG. 5, each sector of correlated audio content contained within the omni-directional pattern 505, is flanked by a lobe containing decorrelated audio content derived by subtracting R from L and a lobe containing decorrelated audio content derived from subtracting L from R. In one embodiment, with a lower-order mid-side mode with a dipole beam, one lobe contains R–L content, while the other lobe contains L–R content.

Along with deciding which sound rendering mode to use, the decision logic 215 may also spatially duck the program audio in response to an alert message, by causing the listener's perception of the piece of sound program content that is currently being outputted by the loudspeaker cabinet 110 to be changed by pulling the program audio from a "foreground" and moving it into a "background," giving the listener the perception that the piece of sound program content is being outputted at a far away place (e.g., in another room). By outputting the piece of sound program content in the background, the origin of output (e.g., the loudspeaker cabinet 110) is "blurred" or rather the origin of output is not easily identifiable to the listener. In one embodiment, a blur routine (see FIG. 2A) in the decision logic 215 adjusts the portions of program audio (e.g., by spatially ducking the program audio), before passing them on to the rendering processor 210 (so the rendering processor 210 is no longer receiving the program audio directly and instead is receiving the adjusted program audio from the blur routine of the decision logic 215.) In another embodiment, the rendering processor 210 may continue to receive the program audio directly, and when the program audio is to be spatially ducked, the decision logic 215 may instruct the rendering processor 210 how to do so.

An example application of the spatial ducking is as follows. Returning to FIG. 1B, proceeding from left to right on both timelines, the program audio 130 is being outputted by the loudspeaker cabinet 110, without any interruption (pauses or breaks) by the responses of a virtual personal assistant (VPA.) In one embodiment, the program audio 130 at this point is being outputted normally (e.g., according to a current rendering mode in which the rendering processor is operating) through the loudspeaker cabinet 110. Next, the listener attempts to initiate a VPA conversation by saying a trigger phrase (e.g., "Hey Hal, do you read me?") Once the trigger phrase is detected, a VPA conversation is said to begin, thereby resulting in a portion of the program audio being spatially ducked by the loudspeaker cabinet 110. In this example, the portion of the program audio covers a contiguous interval of the program audio, whose duration coincides with the conversation between the listener and the VPA. With the program audio spatially ducked, a VPA vocal response 140 (e.g., "How can I help you Dave?") is rendered and outputted through the loudspeaker cabinet 110. Once the VPA vocal response 140 has been outputted, the VPA waits (e.g., delays) for a particular amount of time (e.g., three seconds), in order to allow the listener time to issue a command (e.g a question) to the VPA. During the delay, a question is asked by the listener, e.g., "What time is it in Japan?" This command is sensed by a microphone (that may be coupled to or integrated with the loudspeaker cabinet.) The sensed command is then interpreted by the VPA, which may take some time (e.g., two seconds). Once a VPA vocal response 145 (e.g., "It is five o'clock") to the sensed command is retrieved, it is rendered and outputted through the loudspeaker cabinet 110. Again, the VPA may delay for a particular period of time in order to allow the listener more time to issue a follow-up command. With no follow-up command received, the VPA conversation ends, and spatial ducking of the portion of the program audio is removed or turned off, allowing the program audio to be outputted normally by the loudspeaker cabinet. This process (or at least part of this process) may be performed by the audio system 200 each time the listener says a trigger phrase in order to initiate a conversation with the VPA.

To spatially duck the program audio of a piece of sound program content, the blur routine in the decision logic 215 may perform a decorrelation process upon at least a selected portion of the program audio (e.g., the correlated or monophonic content contained) within at least one beam pattern that is being emitted by the loudspeaker cabinet 110. In one embodiment, the decision logic 215 selects the portion of the program audio that may include correlated content. For example, referring to FIG. 3, when the rendering processor 210 is rendering audio using the main-diffuse (ambient-direct) rendering mode, the decision logic 215 may perform decorrelation upon a selected portion of the program audio that includes correlated content within the main content pattern 305. In contrast, in a mid-side mode (FIG. 5), the decision logic 215 may perform decorrelation upon a selected portion of the program audio that includes correlated content within the omni-directional pattern 505. More about the effects of performing decorrelation and how to do so upon portions of the program audio, in the different modes, is further described below.

The decision logic 215 may perform decorrelation upon portions of the program audio in different ways. For example, the decision logic 215 may do so by adding reverberation to one or more of the input audio channels of the program audio. The amount of reverberation added may be based on the room acoustics. For example, the decision logic 215 may determine how much reverberation to add based on a measured impulse response of the room in which the loudspeaker cabinet 110 is contained. Using the measured impulse response, the decision logic may evaluate how reverberant (e.g., diffuse) the room is based on an estimated kurtosis (e.g., "peakedness") of the impulse response. The larger the kurtosis, the less diffuse the room. Therefore, the decision logic 215 may add reverberation to reduce the estimated kurtosis, thereby smoothing out the impulse response, which results in an increase of diffusiveness of the room effect. This "reverberation assisted decorrelation" results in an audio "blur" effect perceived by the listener. With the addition of reverberation, portions of the program audio that include correlated content within the beam patterns thus become decorrelated. The decorrelation process performed upon the portions of the program audio within the beam pattern achieves the "spatial" (or diffusive) aspect of the ducking, which creates a blurred impression (on the listener) of the program audio, giving the impression of being outputted in the "background." More about the effects of spatial ducking on the listener is further described below in connection with FIG. 4.

In one embodiment, the decision logic 215 may perform decorrelation upon the selected portions of the program audio in the beam patterns by applying a head-related transfer function (HRTF) to one or more of the input audio channels. In another embodiment, the decision logic 215 may use cross-talk cancellers to decorrelate the selected portions of the program audio. In yet another embodiment, when the program audio comprises a single (e.g., mono) signal, the decision logic 215 may upmix it into a multi-channel signal (e.g., with L and R channels), thereby creating decorrelated content within the two channels. It should be understood that the decision logic 215 might use any means to decorrelate the selected portions of the program audio.

Along with decorrelating the portions of the program audio, the decision logic 215 may also move (e.g., pan) those portions from one beam pattern to another beam pattern, during output of the piece of sound program content. For example, referring to FIG. 3, in the ambient-diffuse mode, the decision logic 215 may move and decorrelate a portion of the program audio contained within the main content pattern 305, into one or both of the diffuse content patterns 310 and/or 315. In the mid-side mode of FIG. 5, the decision logic 215 may move (at least some of) and d-correlates a portion of the program audio that is presently contained within the omni-directional pattern 505, into one or more of the lobes of the directional pattern 525. By adding alert audio, which is considered to be "correlated" with respect to the input audio channels, into the main content pattern 305 (or into the omni-directional pattern 505), the audio system 200 may produce a listening experience in which the listener perceives the added alert audio in the "foreground", while the program audio is now in decorrelated form and is being output through a different set of beams, and is therefore in the background. More about adding alert audio in place of the moved, newly decorrelated audio content is described later. The decision logic 215 may instruct the rendering processor 210 to move the now decorrelated content of the portion of the program audio, between different beam patterns.

In one embodiment, movement of a decorrelated portion of program audio (between beams) may occur inherently in response to decorrelating that portion. To explain, consider that the decision logic 215 has a content analysis routine, which may analyze its input audio channels (e.g., L and R of the program audio), using time-windowed correlation, to find correlated content and decorrelated content therein. If this analysis is now performed after the blur routine of the decision logic 215 has added reverberation into the input audio channels, then because the content analysis routine now finds decorrelated content due to the added reverberation, the decision logic 215 will inform the rendering processor 210 that this, modified input audio should be rendered in i) at least one of the diffuse content patterns 310 and/or 315, when the program audio is being rendered in the main-diffuse rendering mode (e.g., FIG. 3), or at least one of the lobes of the directional pattern 525, when the program audio is being rendered in one of the mid-side rendering modes (e.g. in FIG. 5).

Figure 2B:
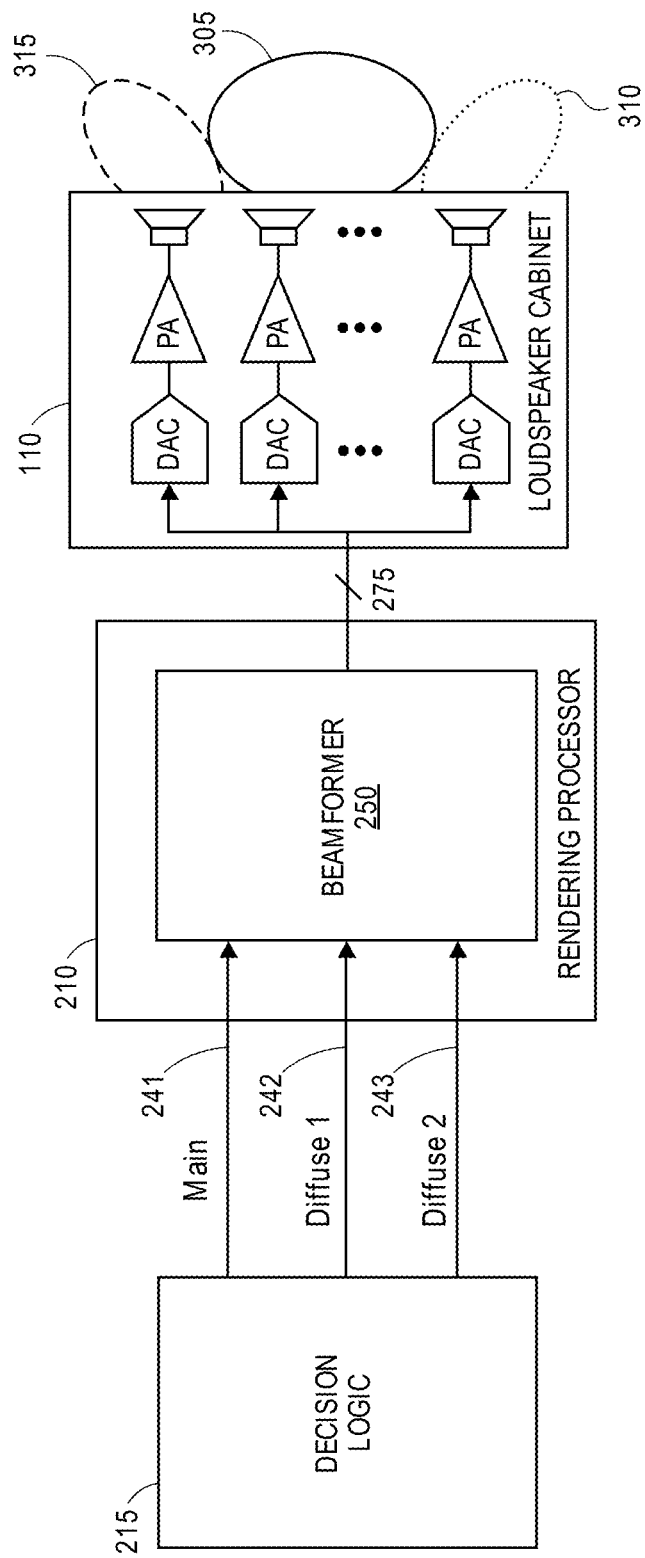
FIG. 2B shows a detailed block diagram of an audio system similar to the one in FIG. 2A.

In one embodiment, a beam former within the rendering processor 210 continues to render its input audio signals into beams, without changing its beam configurations (e.g., shape and aim of the beams), even though spatial ducking has been activated. FIG. 2B illustrates such an example. Specifically, this figure shows the decision logic 215 providing several beam former input signals 241-243 to a beam former 250 within the rendering processor 210. The beam former 250, based on a beam configuration instruction provided by the decision logic 215, uses the input signals 241-243 to generate driver signals to drive the loudspeaker array 120 (within the loudspeaker cabinet 110) to produce beam patterns. As will be illustrated below, when spatial ducking has been activated, the decision logic may simply adjust the sound content within the produced beam patterns (blurs the sound by adding reverberation), but will not adjust the shape or the aim of the beams.

For example, prior to spatial ducking, the rendering processor 210 receives the program audio as several beam former input signals 241-243 from the decision logic 215. The decision logic 215 produces the beam former input signals from portions of the program audio. Each of the beam former input signals may contain the audio content that is to be output in a particular beam pattern produced by the loudspeaker array, e.g., a main content pattern 305, and two diffuse content patterns 310 and 315. During such operation, the listener may attempt to initiate a conversation with the VPA, by saying a trigger phrase or pressing a button. In response to detecting the trigger phrase or the menu button press (both being examples of an alert audio triggering event), and retrieving a suitable audible response (alert audio), the speech-based service 230 may transmit an alert message 235 that points to or contains an alert audio to the decision logic 215.

In response to the alert message, (1) the blur routine of the decision logic adds reverberation to the portion of the program audio (to at least one channel in that portion, which portion may cover two or more channels) that is currently being output as direct sound through the main content pattern 305, and (2) the decision logic adds the alert audio in-phase to that portion, without reverberation (e.g., the alert audio is added in this manner to all of the two or more channels of the program audio that are in the portion which is being output in the main beam 305.) As described above, the content analysis routine in the decision logic will detect this change to the input audio channels, and so the decision logic will therefore keep the alert audio (because it is correlated across multiple input channels) within the signal 241 (main), while extracting the now decorrelated program audio and moving it into one or both of the signal 242 (diffuse 1) and signal 243 (diffuse 2.) The beam former 250 is not re-configured (e.g. its overall beam configuration as in FIG. 3 or in FIG. 5 remains the same), and remains oblivious to the change in the content of its input signals 241-243, and the sound output is the desired result: the alert audio has effectively replaced the program audio in the main pattern 305, and the direct content in the original program audio has been moved into the diffuse content patterns 310, 315.

The decision logic 215 may also apply other audio processing operations while the program audio is being spatially ducked. For instance, the decision logic 215 may filter the portion of the program audio through a set of low pass filters to remove high-frequency content. In one embodiment, the decision logic 215 may adjust the cut-off frequency of the low-pass filter, according to certain audio characteristics. For instance, the cut-off frequency may be adjusted according to a content analysis of the program audio. The decision logic 215 may also reduce a volume level of the portion of the program audio that is to be moved, by applying ducking values (or dynamic range compression values). In one embodiment, the application of ducking values may be dependent on (i) whether the decision logic 215 is applying a low-pass filter and (ii) a current volume level of the program audio. For example, with the removal of high frequency content during the application of a low-pass filter, the perceived loudness of the program audio may be naturally reduced. Hence, if the program audio is already at a low threshold, the decision logic 215 may not apply ducking values, since lowering the volume would be unnecessary (due to the high-frequency content). In one embodiment, the application of ducking values is proportional to a volume level of the program audio.

In one embodiment, the decision logic 215 may gradually spatially duck (e.g., apply the previously-mentioned operations to) the program audio, so as to not abruptly interfere with output. For instance, once the decision logic 215 begins to decorrelate the portion of the program audio (e.g., add reverberation into the input audio channels), this may result in the gradual removal of the portion of the program audio from one beam pattern (e.g., the main content pattern 305), and its gradual addition to one or more other beam patterns (e.g., the diffuse content patterns 315 and/or 310). The decision logic may add the reverberation until all (or most) of the portion of the program audio has been decorrelated and moved to the other beam pattern(s). It may take a short period of time (e.g., two seconds) in order for the program audio to be fully spatially ducked. In another embodiment, the program audio may be spatially ducked instantaneously. Once the audio system 200 no longer requires the program audio to be spatially ducked, the spatially ducked portion of the program audio may be returned to its original beam pattern (e.g., main content pattern 305) in a reverse fashion. For instance, as the decorrelated content of the portion of program audio is becoming correlated (e.g., based on the removal of the added reverberation from the input audio channels), it may be returned to its original beam pattern.

Returning to FIG. 2A, activation of spatial ducking by an alert audio triggering event may be by a speech-based service 230. The speech-based service 230 is for allowing a listener to initiate and conduct a conversation with a computer program that works as a virtual personal assistant ("VPA"), running in the audio system 200, and stored in local memory of the loudspeaker cabinet 110. By communicating with a VPA, the listener is able to ask questions (e.g., by verbalizing commands) and, in response, receive audible responses that are outputted by the loudspeaker array 120. Specifically, a listener may attempt to initiate a conversation with the VPA by saying a "trigger phrase", which is sensed by a microphone 201 of the audio system 200. The microphone 201 may convert the sensed speech into an audio signal and then transmit it to a trigger phrase detector (an automatic speech recognizer), within the speech-based service 230, to analyze the signal in order to identify (e.g., recognize) a trigger phrase therein. In one embodiment, the trigger phrase detector may compare the recognized speech to pre-stored trigger phrases that are stored (e.g., in a lookup table) in local memory, and when a match is found, it may determine that the listener has spoken a trigger phrase. Once a trigger phrase is detected, the speech-based service 230 may retrieve a suitable vocal response to the trigger phrase (formulated or accessed from storage).

In another embodiment, the alert audio triggering event may be a button press by the listener, which could be reported to the speech-based service 230 by another software process running in the loudspeaker cabinet. In response, the speech-based service 230 may retrieve a suitable textual response based on at least one of several factors. For example, if the event was a spoken trigger phrase, the response may be based on a listener identification process that is performed on the speech signal in order to identify who spoke the trigger phrase. Once the listener is identified, the speech-based service 230 may tailor the response to the listener, e.g., "How can I help you, Dave?" where Dave is the listener. In one embodiment, the response may be based on the owner of the loudspeaker cabinet 110. In another embodiment, the response may just be a generic response, e.g., "How can I help you?" The retrieved suitable response may be provided to a text-to-speech ("TTS") system to produce a synthesized speech version thereof. Alternatively, the audio response may be retrieved as a previously recorded human-spoken phrase (that is deemed suitable to be a response to the trigger phrase.) In both instances, an audio signal, referred to here as alert audio, which includes a suitable speech response by the VPA, may be provided to the rendering processor 210, intended to be outputted through the loudspeaker array 120 of the loudspeaker cabinet 110, in response to the particular alert audio triggering event.

In one embodiment, the alert audio triggering event may be a signal from another application program currently being executed in the audio system 200, that the application program needs to output audio content. For example, while program audio is being outputted, a reminder application may need to remind the listener of her scheduled meeting at a particular time. When that time comes, the reminder application may signal the speech-based service 230, which in turn sends an alert message to the decision logic 215 that points to or contains an alert audio desired by the reminder application (e.g., a synthesized version of "Tee time is in 30 minutes") to be outputted through the loudspeaker array 120. In another embodiment, a navigation application may need to provide the listener with navigation instructions, while program audio is being outputted. When a maneuver is imminent, the navigation application may provide an alert message directly to the decision logic 215, along with its desired alert audio (e.g., a synthesized or human-spoken version of "Turn left in 1.5 miles"), and the decision logic 215 will respond to this as described above, causing the program audio to be spatially ducked and replaced with the alert audio. Once outputting of the alert audio is complete, the decision logic 215 may immediately (or within a short period of time—such as no longer than two seconds) remove the spatial ducking, since no vocal interaction with the listener is required in this case. In other embodiments, a requesting application (requesting an audio alert to be output) may communicate with the speech-based service 230 in order to spatially duck the program audio. For example, the navigation instruction may instruct the speech-based service 230 to provide the alert message and the alert audio to the decision logic 215.

If an event occurs while program audio is being outputted, the speech-based service 230 may provide an alert message 235 that points to or contains the alert audio, which includes the suitable speech (e.g., vocal) response by the VPA, intended to be outputted in response to the event, to the decision logic 215. In response to receiving the alert message 235, the decision logic 215 spatially ducks the program audio, so that the alert audio can be outputted to the listener. For instance, while program audio is being outputted, the speech-based service 230 may request (through the transmission of the alert message) the decision logic 215 to spatially duck the program audio, in order for the alert audio to be outputted to the listener through the beam patterns being emitted by the loudspeaker array 120. The decision logic 215 may receive (or retrieve) the alert audio in several ways. For instance, the decision logic 215 may receive the alert audio from (e.g., the TTS system within) the speech-based service, it may retrieve the alert audio from the alert message 235 itself, or it may retrieve the alert audio based on data contained within the alert message 235 (e.g., pointer information telling the decision logic 215 where to retrieve the alert audio from memory). In one embodiment, the decision logic 215 receives (or retrieves) the alert audio in response to receiving the alert message 235. In another embodiment, the decision logic 215 may receive the alert audio contemporaneously with the alert message 235 (e.g., from the speech-based service 230.)

The alert message 235 informs the decision logic 215 that (i) the program audio being outputted is to be spatially ducked and (ii) simultaneously, the alert audio is to be rendered and added to at least one of the beam patterns. Specifically, the alert audio may be added to the at least one beam pattern (e.g., the main content pattern 305 or the omni-directional pattern 505) by replacing the decorrelated content of the portion of the program audio that was moved into other beams (e.g., the diffuse content patterns 310 and 315, or the directional pattern 510), when the program audio was spatially ducked. By spatially ducking the program audio, while the alert audio is outputted to a listener, this allows the listener to hear the alert audio, in the foreground, while the program audio continues to output in the background. In a sense, the rendered alert audio drives the loudspeaker array 120 so as to replace the (previously correlated) portion of the program audio in (e.g., the main content pattern 305 or the omni-directional pattern 505) with the alert audio. In this way, the listener after vocalizing a trigger phrase in order to initiate a VPA running in the audio system 200 receives an immediate and intelligible audible response from the audio system 200, without being muffled by the program audio, as the latter continues to be outputted in the background.

In order to ensure that the alert audio replaces the newly decorrelated content of the portions of program audio, it may be added at different points throughout the process. Since the alert audio includes a suitable audio response, either synthesized by the TTS system, or a previously recorded human-spoken phrase, the alert audio may be a single (or monophonic) audio channel. Therefore, in one embodiment, the alert audio may be added (e.g., by the decision logic 215), equally to the left and right input audio channels, for example. In one embodiment, the alert audio is equally added, such that the alert audio is added in phase into the left and right input audio channels, as was described above. In this way, the alert audio appears as correlated content, in the two input channels, and will be so recognized by the content analysis routine, which in turn instructs the rendering processor 210 to render it accordingly (depending on the current rendering mode.) By adding the alert audio equally, the alert audio will be recognized as correlated content within the input audio channels (e.g., L and R), thereby ensuring that the alert audio is placed within a beam pattern that normally contains correlated content, regardless of which rendering mode the rendering processor 210 is using. For instance, if the program audio is being rendered in the main-diffuse rendering mode, referring to FIG. 4, the alert audio will be rendered in the main content pattern 305, rather than in the diffuse content patterns 310, 315 that are aimed away from the listener. That may be because when the decision logic 215 analyzes the adjusted versions of the input audio channels of the program audio, which now also include the alert audio, the decision logic 215 finds as correlated content the alert audio, while the decorrelated content that it finds is from the original program audio.

Figure 6:
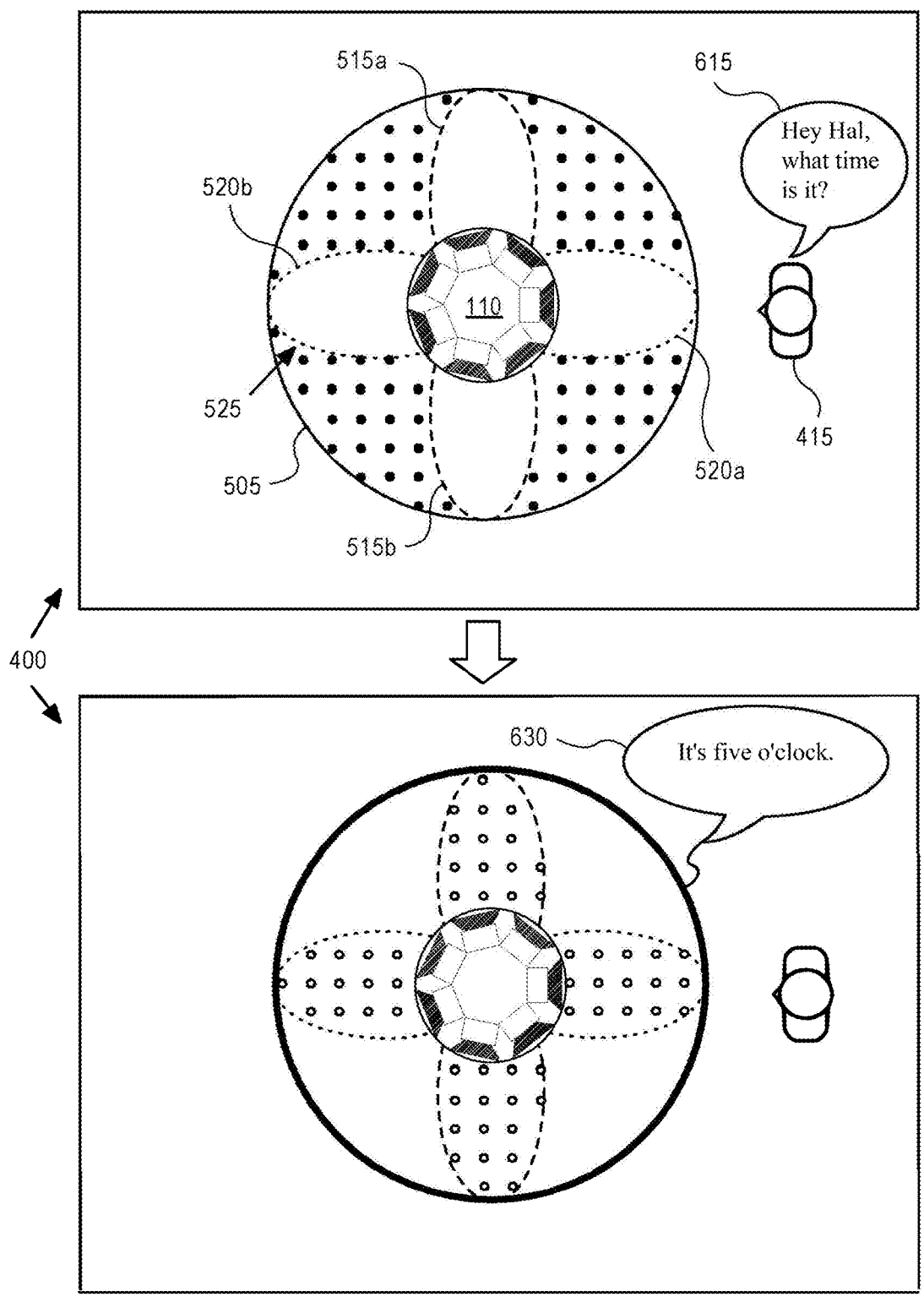
FIG. 6 shows a progression of several stages, in which the user interacts with the audio system that is operating as shown in FIG. 5.

In another embodiment, while the rendering processor 210 is in a mid-side mode—see FIG. 6—the alert audio may be added (by the decision logic) equally to both the L and the R input audio channels, so that it appears as correlated content in the omni-directional pattern 505 (as L+R), but essentially absent from the lobes 515a, 515b, 520a, 520b (as L−R and R−L). At the same time, the program audio contained in L (or in R) is decorrelated, such that it remains decorrelated in the lobes (which is where the rendering processor 210 is producing L−R and R−L content.)

Once the entirety of the alert audio has been outputted to the listener, or the output of the alert audio has been completed, the decision logic 215 may then deactivate the spatial ducking, in order to return output of the program audio to its prior operating conditions. As previously described, the decorrelated content of the portion of the program audio may be returned to its original beam pattern, in a reverse fashion to which it was originally removed. For instance, the decision logic 215 may gradually revert the decorrelated content of the portion of the program audio into correlated content (e.g., by gradually removing the added reverberation from the input audio channels) and contemporaneously adding it gradually back into its original beam pattern. In one embodiment, if other audio processing operations (e.g., low-pass filters and ducking values) had been performed on the portion of program audio, while it was being spatially ducked, those operations may also be removed or turned off (deactivated), in a reverse fashion as well. Returning the audio system 200 to prior operating conditions may take a short period of time (e.g., two seconds) or it may be essentially immediate.

In one embodiment, the audio system 200 may stay spatially ducked for a longer period after the alert audio has ended (e.g., five seconds) in order to allow the listener some additional time to give the audio system 200 a follow-up command (e.g., "What time is it?"). For instance, the microphone 201 may sense the command and convert it into an audio signal. The microphone 201 may transmit the converted audio signal to the automatic speech recognizer in order for it to recognize speech therein. From the recognized speech, the speech-based service 230 may identify that the words spoken by the listener is a command (or question). The speech-based service 230 may then transmit, via the Internet, the recognized speech to a digital assistant server to analyze and generate a suitable textual response to the command. In one embodiment, the speech-based service 230 may transmit the command to the server, without first identifying whether the recognized words includes a command or question, since it may assume that words spoken after the trigger phrase is a command. Once the speech-based service 230 receives the suitable textual response to the command from the server, it may have the TTS system synthesize the textual response to the command into alert audio to be added to the beam pattern, which projected the alert audio (e.g., the main content pattern 305 or the omni-directional pattern 505), in a similar fashion to which the previously-described alert audio was added.

In one embodiment, rather than receiving a suitable textual response, the speech-based service 230 may receive a previously recorded human-spoken phrase as audio to be added to the beam pattern. If, however, no command is received, the audio system 200 may return to its prior operating conditions. In one embodiment, the decision logic 215 waits for at least a predetermined delay time interval, after having completed the output of the alert audio, before removing the spatial ducking. In another embodiment, the decision logic 215 waits until it receives another alert message 235 from the speech-based service 230, indicating that the conversation between the VPA and the listener has concluded, before it removes the spatial ducking. Thus, in one embodiment, the portion of the program audio that is spatially ducked (e.g., moved into the directional pattern in a mid-side rendering mode) is a contiguous interval of a musical composition or motion picture film sound track, whose duration coincides with the duration of a conversation between the listener and a virtual personal assistant.

In one embodiment, the decision logic 215 may decide whether to spatially duck the program audio based on the context of the sound program content currently being outputted by the loudspeaker cabinet 110, as determined by a content context routine (depicted in FIG. 2A.) For instance, if the sound program content is a musical composition or an audio soundtrack (e.g., in 5.1 surround format) of a motion picture film or movie, the decision logic 215 may decide to spatially duck the program audio in response to receiving an alert message 235. If, however, the context of the sound program content indicates that there is primarily dialog (e.g., a podcast or an audiobook) the decision logic 215 may just simply lower the volume of the program audio significantly, while the alert audio is outputted. This decision may be based on the fact that outputting alert audio, which is speech of the VPA, and continuing to output sound program content that primarily contains dialog may be too confusing for the listener, since there will be two simultaneous talkers (e.g.,the dialog and the speech of the VPA) talking at the same time about two different topics.

Figure 4:
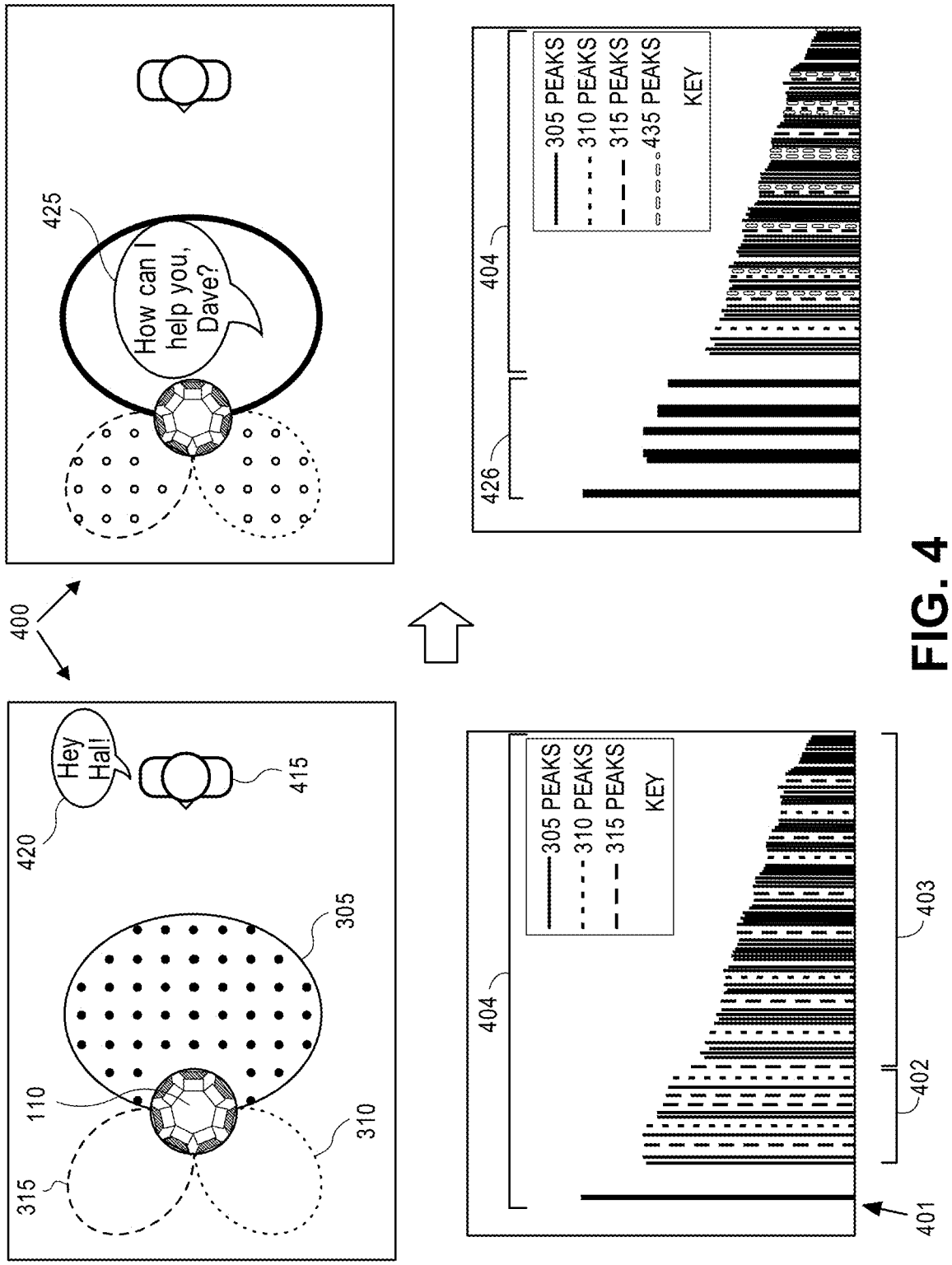
FIG. 4 shows a progression of several stages, in which a user interacts with the audio system that is operating as shown in FIG. 3.
Figure 7:
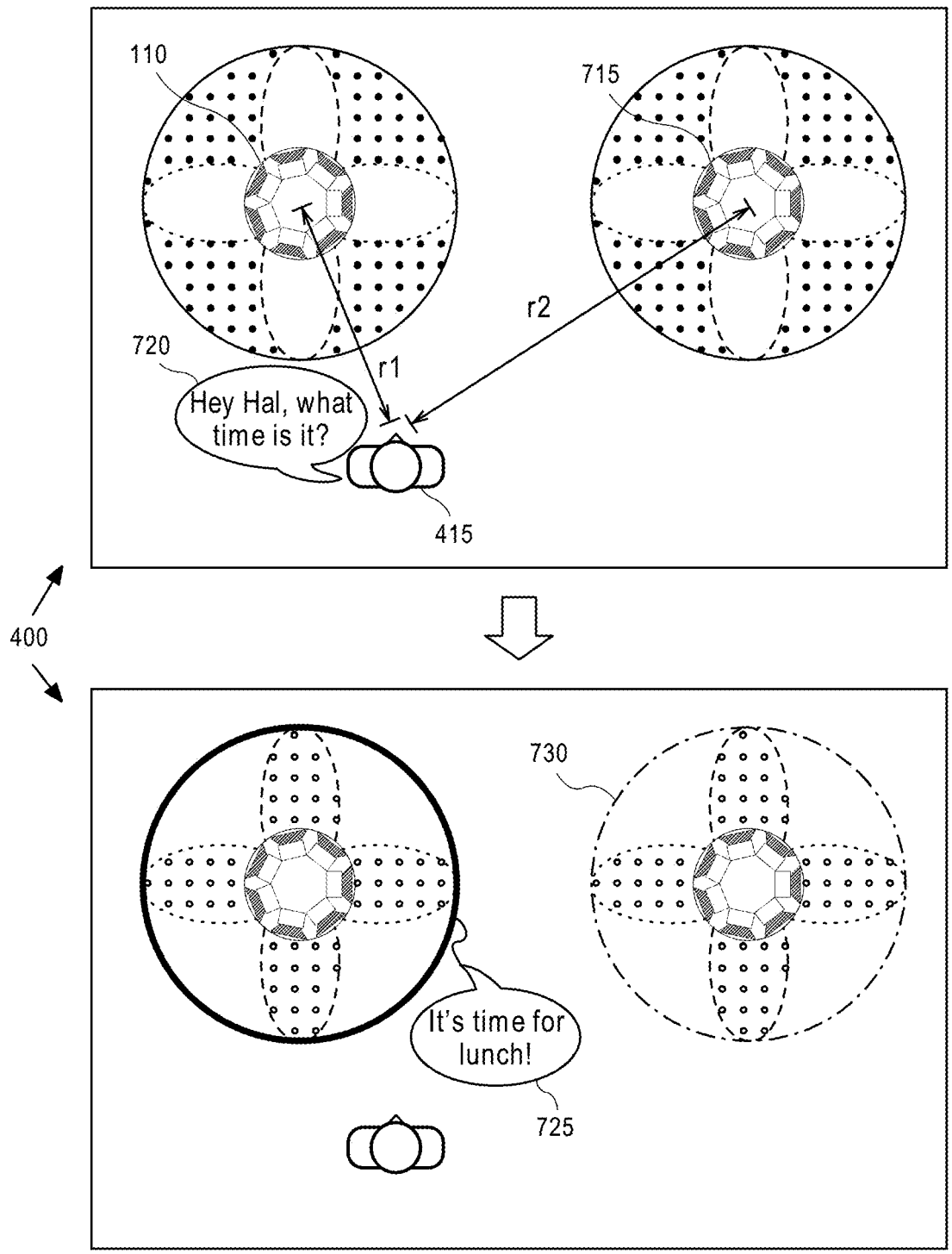
FIG. 7 shows a progression of several stages, in which the user interacts with one of several audio systems that are each operating as shown in FIG. 5.

FIGS. 4 and 6-7 depict examples, illustrating the effect of spatial ducking performed while the loudspeaker cabinet 110 is rendering program audio in different modes. Each of these figures will be described by reference to the system block diagram of FIG. 2A. FIG. 4 shows the effect of outputting alert audio through a beam that in this example is aimed at a listener's position, while program audio that is being rendered in a main-diffuse rendering mode is spatially ducked. FIG. 4 shows two stages. In the left stage is shown a room 400, in which loudspeaker cabinet 110 is outputting program audio on one side of the room, while a listener 415 is listening on another side of the room 400. To output the program audio, the loudspeaker cabinet 110 is using the main-diffuse rendering mode, illustrated in FIG. 3. The main content pattern 305 includes correlated (or direct) audio content (which is shown as solid black circles inside the main content pattern 305) of a portion of the program audio, being directed towards the listener 415. At the same time, there are two diffuse content patterns 310 and 315 that include decorrelated (or diffuse) audio content of another portion of the program audio directed away from the listener 415. For example, the portion of the program audio in the main content pattern 305 may be the dialogue in a movie scene, while the portion of the program audio in the diffuse content patterns 310, 315 may be ambient sounds in the movie scene (such as birds chirping.)

While the listener 415 is listening to the piece of sound program content being outputted by the loudspeaker cabinet 110 in the room 400, the listener 415 says a trigger phrase 420 "Hey Hal!" to initiate a conversation (or session) with a VPA of the loudspeaker cabinet 110. The loudspeaker cabinet 110 responds to that trigger phrase by spatially ducking the program audio, while outputting the alert audio containing a suitable response to the listener's spoken trigger phrase—this is depicted in the right stage of FIG. 4. Specifically, the loudspeaker cabinet 110 has spatially ducked the program audio by decorrelating (e.g., by adding reverberation into one or more of the input audio channels of the program audio) the correlated audio content of the portion of the program audio in the main content pattern 305, and moving it into at least one of the diffuse content patterns 310 and/or 315. The newly decorrelated content is illustrated as hollow circles, contained within the diffuse content patterns 310 and 315. The program audio is now being output in a diffuse manner within the room 400, which results in the listener perceiving the program audio as being outputted in the background. At the same time, as shown in the right stage of FIG. 4, the alert audio is being rendered in the main content pattern 305, which results in the listener 415 hearing a vocal response 425 "How can I help you, Dave?" In this example, a dark bold line illustrates the addition and output of the alert audio to the main content pattern 305.

As previously described, the loudspeaker cabinet 110 may first spatially duck the program audio, wait a particular amount of time (e.g., one second), output the alert audio, and wait an extended amount of time (e.g., three seconds) before removing the spatial ducking, in order to allow the listener 415 to say a follow-up command. In another embodiment, the audio system may spatially duck the program audio and add the alert audio, contemporaneously.

The concept of a room impulse response (RIR) may be used to illustrate the effect of spatial ducking. As seen in FIG. 4, the left stage shows how the RIR "contains" program audio 404 with peaks corresponding to direct sound 401, early reflections 402, and late reflections 403. In the left stage, these peaks are mapped to the audio content in the various beams, e.g., main content pattern 305, left diffuse pattern 310, and right diffuse pattern 315. In the right stage, the direct and at least some of early reflections of the program audio 404 are suppressed, and in their place is added a sound 426 (e.g., direct and early reflections) that is associated with the alert audio emitted by the main content pattern 305. By suppressing the direct and (at least some of) the early reflections of the program audio 404, the listener 415 is able to hear a crisp and intelligible vocal response 425 from the loudspeaker cabinet 110. As seen in the right stage, while the program audio 404 has been suppressed in the direct sound and early reflections, the diffused (or spatially ducked) program audio 404 is still present in the late reflections 403 (or reverberation). With the addition of the decorrelated audio content 435 (depicted as hollow circles within the diffuse content patterns 310 and 315), the density of the reverberation 403 has been increased as seen in the right stage.

The RIR concept introduced above helps to illustrate the effect of spatial ducking on the listener 415, in particular, how the apparent origin of sound output (e.g., the loudspeaker cabinet 110) is "blurred" or rather, not easily identifiable to the listener 415. For example, suppressing the direct sound and (at least some of) the early reflections associated with the program audio 404, while allowing the program audio 404 contained within the reverberation 403 to remain, puts the listener 415 in a diffusive environment, removing or blurring any indication of where the program audio originated. In other words, this diffusive environment gives the listener 415 the perception that the program audio is being outputted in "the background," which gives the same effect as listening to audio in a very large room, a big hall, or a cathedral, for example. Then, adding the correlated (and monophonic) alert audio into the main content pattern 305, gives the listener 415 the impression that the alert audio is in the "foreground". Furthermore, by removing at least a portion of the program audio 404 from the early reflections 402, it allows the listener 415 to hear a crisp and intelligible vocal response associated with the alert audio 426, without any other sound interference produced by the loudspeaker cabinet 110 in the early reflections 402. Hence, spatially ducking program audio allows the listener 415 to initiate and conduct a conversation with the VPA, without the need to stop output of the program audio of the piece of sound program content while at the same being able to clearly hear the VPA.

FIG. 6 shows the effect of outputting alert audio, while program audio that is being rendered in a mid-side rendering mode is spatially ducked. Specifically, FIG. 6 shows two stages in which a loudspeaker cabinet 110 spatially ducks program audio that is being outputted in a higher-order mid-side rendering mode, in response to receiving a command (which may include a trigger phrase) from a listener.

The first (or top) stage illustrates room 400 in which loudspeaker cabinet 110 is outputting program audio of a piece of sound program content in the middle of the room, while listener 415 is listening on a right side of the room 400. To output the program audio, the loudspeaker cabinet 110 is using a higher-order mid-side rendering mode, illustrated in FIG. 5. Specifically, the loudspeaker cabinet 110 is producing an omni-directional pattern 505 that includes correlated audio content (which is shown as solid black circles inside the omni-directional pattern 505) of at least one portion of the program audio, and a directional pattern 525 with four lobes 515*a-b* and 520*a-b* that each include decorrelated audio content of at least one portion of the program audio. As previously described, these beam patterns may be composed of either a combination and/or a difference of two or more input audio channels of the program audio. Similar to the loudspeaker cabinet of FIG. 4, the decision logic 215 may base its decision (or selection) to render the program audio using the higher-order mid-side rendering mode based on the same factors that were previously described. For instance, in one embodiment, the decision logic 215 selected the higher-order mid-side rendering mode because it determined (e.g., through sensor data) that it was in the middle (or past a threshold distance from any wall) of the room 400.

In the top stage of FIG. 6, the listener 415 asks the loudspeaker cabinet 110 (in particular, the VPA running in the audio system 200 of the loudspeaker cabinet 110) a command (e.g., question) in order to incite an answer, which is preceded with a trigger phrase. Specifically, the listener 415 may say the phrase 615, "Hey Hal, what time is it?" As previously described, the loudspeaker cabinet (through a microphone) senses the sound of the spoken question by converting it into an audio signal, which may then be fed to a trigger phrase detector (an automatic speech recognizer) of the speech-based service 230—see FIG. 2A. The trigger phrase "Hey Hal" may be detected. However, unlike the previous examples, the listener 415 has also included a follow-up command with the trigger phrase (e.g., "what time is it?") The speech-based service 230, recognizing that there is an additional speech signal that follows the trigger phrase, may transmit the additional speech signal to a digital assistant server, via the Internet. The server will analyze the additional speech signal to recognize the speech therein and may formulate a suitable textual response that is transmitted back to the speech-based service 230. Once the speech-based service 230 receives the suitable textual response, the TTS system synthesizes the textual response into an audio signal, which becomes the alert audio that is to be added to a beam pattern. In another embodiment, instead of a textual response, the speech-based service 230 may receive a previously recorded human-spoken response from the server (that becomes the alert audio.) In order for the alert audio to be added to a beam pattern, the speech-based service provides an alert message 235 to the decision logic 215, informing it to spatially duck the program audio in order for the retrieved alert audio (responding to the phrase 615) to be outputted.

The next (or bottom) stage in FIG. 6 illustrates the loudspeaker cabinet 110 spatially ducking the program audio, while outputting an alert audio containing a command response by the VPA. Specifically, the loudspeaker cabinet 110 has spatially ducked the program audio by (i) decorrelating the correlated audio content (illustrated as the solid black circles inside the omni-directional pattern 505 in the first stage), and thereby (ii) moving the decorrelated content out of the omni-directional pattern 505 and into the directional pattern 525. The added decorrelated audio content is depicted as hollow circles contained within the lobes of the directional beam 525. In one embodiment, the decorrelated audio content is added to the lobes of the directional pattern 525 based on the location of the correlated audio content (solid black circles) in the omni-directional pattern 505 that is depicted in the top stage, from which it is derived. For example, the loudspeaker cabinet 110 may designate particular sections of the correlated content into a neighboring lobe of the directional pattern 525. Since each lobe is separated by 90 degrees from each neighboring lobe, with respect to the loudspeaker cabinet 110, decorrelated content derived from correlated audio content within 45 degrees about either side of each lobe is added to that lobe. For example, assume that the front-pointing lobe 520a is emitted at 0 degrees from the loudspeaker cabinet. Decorrelated audio content derived from correlated audio content between 45 degrees and −45 degrees and within the omni-directional pattern 505 is then to be subsequently moved into the front-pointed lobe 520a, when the program audio is spatially ducked. Once the program audio has been spatially ducked, the audio system 200 adds the alert audio into the omni-directional pattern 505, to output the command response of "It's five o'clock" 630. Once the alert audio has been outputted, and the speech-based service 230 does not sense a follow up question/command from the listener 415, the loudspeaker cabinet 110 will remove the spatial ducking and return the correlated audio content back into the omni-directional pattern 505.

In one embodiment, an impulse response measured by the loudspeaker cabinet 110 while in the mid-side rendering mode may be similar to the impulse response measured for the main-diffuse rendering mode, and that is shown in FIG. 4. In particular, since the correlated audio content of the program audio is decorrelated and moved into the directional pattern 525, this may result in the direct and early reflections of program audio sound being suppressed, and the sound of the vocal response from the alert audio can take its place. This may have a result similar to the main-diffuse rendering mode, in that the sound of the vocal response may be perceived by the listener 415 to be in a foreground, while the decorrelated program audio is in a background.

In one embodiment, the loudspeaker cabinet 110 may perform variations of the process described in FIG. 6. For example, referring back to FIG. 2A, the alert message 235 may be provided to the decision logic 215, from the speech-based service 230, after the trigger phrase detector, detects the trigger phrase "Hey Hal" (similar to FIG. 4). In this example, the decision logic 215 may spatially duck the program audio, in anticipation of adding an alert audio for responding to a listener command, which is to be received from the digital assistant server. By spatially ducking the program audio before a response is received, the listener is made aware that the VPA has heard the listener's command and is formulating/retrieving an appropriate response. Otherwise, the listener may be left wondering, whether the VPA heard the trigger phrase and/or command at all.

The previously described examples have illustrated the effect of outputting alert audio, while program audio that is being outputted by a single loudspeaker cabinet is spatially ducked. FIG. 7 shows an example in which program audio that is being outputted on two loudspeaker cabinets is spatially ducked, in order to allow alert audio to be outputted on at least one of the loudspeaker cabinets. Specifically, FIG. 7 shows two stages in which two loudspeaker cabinets 110 and 715 spatially duck program audio that is being outputted in a higher-order mid-side rendering mode, in response to receiving a command (e.g., a trigger phrase) from a listener.

The first (or top) stage illustrates several loudspeaker cabinets 110 and 715 outputting program audio of a piece of sound program content, while in a higher-order mid-side rendering mode. In particular, loudspeaker cabinet 110 is outputting program audio in the upper-left portion of the room 400 and loudspeaker cabinet 715 is outputting program audio in the upper-right portion of the room 400, while listener 415 is listening at a location towards the left-lower side of the room 400. In one embodiment, in order for both loudspeaker cabinets to output the same program audio, a communication link (e.g., using BLUETOOTH protocol or a wireless local area network link) may be established between them. With an established communication link, both devices may synchronize their audio output through any conventional means (e.g., an exchange of synchronization messages for synchronizing internal clocks of each cabinet). In one embodiment, both loudspeaker cabinets 110 and 715 may each have an established communication link with an audio source (e.g., a smart phone, a laptop, or a tablet), which transmits the program audio to the cabinets for output.

In one embodiment, both loudspeaker cabinets 110 and 715 may be outputting the same program audio of a piece of sound program content. For instance, the beam patterns being emitted by each loudspeaker cabinet may include the same portions of program audio. In this way, the listener 415 may be fully immersed in sound produced by the loudspeaker cabinets. In another embodiment, the loudspeaker cabinets may be outputting different portions of the program audio. For example, since loudspeaker cabinet 110 is at the left side of the room 400, it may be biased to output a larger portion of a left channel of the program audio, than loudspeaker cabinet 715, which itself may be biased to output a larger portion of a right channel of the program audio.

In the top stage, the listener 415 asks a question (e.g., of the VPA) that is sensed by (e.g., microphones of) both of the loudspeaker cabinets 110 and 715. Specifically, listener 415 says, "Hey Hal, what time is it?" 720. At this point, a determination may be made as to which loudspeaker cabinet should take up the responsibility of outputting the alert audio (which contains the response of the VPA.) This determination may be based on several factors. For example, using any suitable combination of sensor data and user interface selections, a computing process running in one of the loudspeaker cabinets may assign this responsibility to the loudspeaker cabinet that is closest to the listener 415. The loudspeaker cabinets could automatically determine the distance to the listener, relative to each of the loudspeaker cabinets, and so the responsibility in this case may be assigned to loudspeaker cabinet 110 since its distance "r1" from listener 415 is shorter than loudspeaker cabinet 715 distance "r2" from listener 415. The decision to have only one of the two cabinets output the alert audio may be due to the fact that it could be confusing or disruptive to have multiple loudspeaker cabinets output the same vocal response of the VPA. For example, since the listener 415 is closer to loudspeaker cabinet 110, if both loudspeaker cabinets were to output the same alert audio, which is added to the omni-directional pattern 505 of each as correlated content, the listener 415 may experience an unpleasant echo.

The next (or bottom) stage in FIG. 7 illustrates that, although the loudspeaker cabinet 110 has been tasked the responsibility to output the alert audio, both loudspeaker cabinets 110 and 715 will spatially duck the program audio (during alert audio output.) Specifically, each loudspeaker cabinet may spatially duck its portion of the program audio in a similar fashion to that described above in connection with FIG. 4 and FIG. 6. For instance, loudspeaker cabinet 110 may add alert audio into its omni-directional pattern, to output a vocal response 725 of "It's time for lunch!" In contrast, since the other loudspeaker cabinet 715 does not output the alert audio but will spatially duck its program audio, it could simply not produce any audible content in its omni-directional pattern (illustrated as a dotted omni-directional pattern 730). The latter effectively adds to the diffusive sound environment, because the cabinet 715 is still emitting decorrelated content in its directional pattern. Once output of the alert audio is complete, both loudspeaker cabinets may return to their normal rendering modes (as they were prior to the event that triggered the alert audio.)

An embodiment of the invention may be a non-transitory machine-readable medium (such as microelectronic memory) having stored thereon instructions which program one or more data processing components (generically referred to here as "a processor") to perform the digital signal processing operations described above including receiving, rendering, moving, triggering, initiating, signaling, generating, analyzing, comparing, filtering, applying, combining, and subtracting. In other embodiments, some of these operations might be performed by hardwired or programmable logic components that perform specific functions (e.g., dedicated digital filter blocks.) Those operations might alternatively be performed by any combination of programmable processors and hardwired or programmable logic circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for adjusting audio being outputted through two or more speaker drivers of an audio system, the method comprising:
   receiving program audio of a piece of sound program content;
   driving a plurality of speaker drivers using the program audio to produce a first beam pattern that contains a first portion of the program audio and a second beam pattern that contains a second portion of the program audio;
   receiving an alert message associated with alert audio; and
   in response to receiving the alert message
      while the second portion of program audio is being used to drive the plurality of speaker drivers to produce the second beam pattern, moving the first portion of the program audio that is in the first beam pattern into the second beam pattern so that the second beam pattern transitions from i) containing the second portion to containing the second portion combined with the first portion, and
      driving two or more of the plurality of speaker drivers to output the alert audio in the first beam pattern.

2. The method of claim 1, wherein the audio system is either 1) a home audio system that includes at least one loudspeaker cabinet in which at least some of the two or more speaker drivers are integrated or 2) an infotainment system integrated within a vehicle.

3. The method of claim 1, wherein the audio system comprises a portable multimedia device that includes the two or more speaker drivers.

4. The method of claim 1, wherein the alert message is received in response to a trigger detector recognizing a trigger phrase spoken by a listener, wherein the alert audio is a vocal response from a virtual personal assistant.

5. The method of claim 1, wherein the first beam pattern is a main content beam pattern that is directed towards a first direction and the second beam pattern is a diffuse beam pattern that is directed towards a second direction that is different than the first direction.

6. The method of claim 1, wherein the first beam pattern is an omni-directional pattern and the second beam pattern is a directional beam pattern that has a plurality of lobes.

7. The method of claim 1 further comprising decorrelating the first portion of the program audio that is moved from the first beam pattern into the second beam pattern.

8. The method of claim 7, wherein decorrelating the first portion of the program audio comprises adding reverberation to the program audio.

9. An audio system comprising
   a plurality of speaker drivers;
   a processor; and
   memory having instructions stored therein which when executed by the processor causes the audio processor to
      receive program audio of a piece of sound program content;
      drive the plurality of speaker drivers using the program audio to produce a first beam pattern that contains a first portion of the program audio and a second beam pattern that contains a second portion of the program audio;
      receive an alert message associated with alert audio; and
      in response to receiving the alert message
         while the second portion of the program audio is being used to drive the plurality of speaker drivers to produce the second beam pattern, move the first portion of the program audio that is in the first beam pattern into the second beam pattern so that the second beam pattern transitions from i) containing the second portion to containing the second portion combined with the first portion, and
         drive two or more of the plurality of speaker drivers to output the alert audio in the first beam pattern.

10. The audio system of claim 9, wherein the audio system is either 1) a home audio system that includes at least one loudspeaker cabinet in which at least some of the plurality of speaker drivers are integrated or 2) an infotainment system integrated within a vehicle.

11. The audio system of claim 9, wherein the audio system comprises a portable multimedia device that includes the plurality of speaker drivers.

12. The audio system of claim 9, wherein the alert message is received in response to a trigger detector recognizing a trigger phrase spoken by a listener, wherein the alert audio is a vocal response from a virtual personal assistant.

13. The audio system of claim 9, wherein the first beam pattern is a main content beam pattern that is directed towards a first direction and the second beam pattern is a diffuse beam pattern that is directed towards a second direction that is different than the first direction.

14. The audio system of claim 9, wherein the first beam pattern is an omni-directional pattern and the second beam pattern is a directional beam pattern that has a plurality of lobes.

15. The audio system of claim 9, wherein the memory has instructions to decorrelate the first portion of the program audio that is moved from the first beam pattern into the second beam pattern.

16. The audio system of claim 15, wherein the instructions to decorrelate comprise instructions to add reverberation to the program audio.

17. An article of manufacture comprising a machine-readable medium having instructions stored therein that when executed by a processor of an audio system
   receive program audio of a piece of sound program content;

drive a plurality of speaker drivers using the program audio to produce a first beam pattern that contains a first portion of the program audio and a second beam pattern that contains a second portion of the program audio;

receive an alert message associated with alert audio; and in response to receiving the alert message while the second portion of the program audio is being used to drive the plurality of speaker drivers to produce the second beam pattern, move the first portion of the program audio that is in the first beam pattern into the second beam pattern so that the second beam pattern transitions from i) containing the second portion to containing the second portion combined with the first portion, and drive two or more of the plurality of speaker drivers to output the alert audio in the first beam pattern.

18. The article of manufacture of claim 17, wherein the audio system is either 1) a home audio system that includes at least one loudspeaker cabinet in which at least some of the plurality of speaker drivers are integrated or 2) an infotainment system integrated within a vehicle.

19. The article of manufacture of claim 17, wherein the audio system comprises a portable multimedia device that includes the plurality of speaker drivers.

20. The article of manufacture of claim 17, wherein the alert message is received in response to a trigger detector recognizing a trigger phrase spoken by a listener, wherein the alert audio is a vocal response from a virtual personal assistant.

* * * * *